(12) United States Patent
Mori

(10) Patent No.: US 10,205,869 B2
(45) Date of Patent: Feb. 12, 2019

(54) VIDEO PROCESSING APPARATUS, CONTROL METHOD, AND RECORDING MEDIUM

(71) Applicant: CANON KABUSHIKI KAISHA, Tokyo (JP)

(72) Inventor: Shigeki Mori, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/251,589

(22) Filed: Aug. 30, 2016

(65) Prior Publication Data

US 2017/0064192 A1 Mar. 2, 2017

(30) Foreign Application Priority Data

Sep. 2, 2015 (JP) ................. 2015-173285

(51) Int. Cl.
*H04N 5/232* (2006.01)
*G06F 3/048* (2013.01)
*G06F 3/0484* (2013.01)
*G06F 3/0488* (2013.01)

(52) U.S. Cl.
CPC ....... *H04N 5/23212* (2013.01); *G06F 3/0488* (2013.01); *G06F 3/04845* (2013.01); *G06F 3/04847* (2013.01); *H04N 5/23216* (2013.01)

(58) Field of Classification Search
CPC ........... H04N 5/23212; H04N 5/23216; H04N 5/23293; G06F 3/04845; G06F 3/0488; G06F 3/04847
USPC ....... 348/333.01, 333.02, 345–349; 715/767, 715/802, 700, 719, 762
See application file for complete search history.

(56) References Cited

U.S. PATENT DOCUMENTS

| | | | | |
|---|---|---|---|---|
| 9,110,576 | B1* | 8/2015 | Kim | G06F 3/04883 |
| 9,667,881 | B2* | 5/2017 | Harris | H04N 5/2354 |
| 2007/0291152 | A1* | 12/2007 | Suekane | H04N 5/23293 348/333.02 |
| 2010/0020221 | A1* | 1/2010 | Tupman | G06F 3/04883 348/333.01 |
| 2011/0081141 | A1* | 4/2011 | Uenishi | G02B 7/08 396/95 |
| 2011/0267530 | A1* | 11/2011 | Chun | G06F 3/04883 348/333.11 |
| 2011/0305446 | A1* | 12/2011 | Itoh | G03B 13/36 396/95 |
| 2013/0070145 | A1* | 3/2013 | Matsuyama | H04N 5/23216 348/333.12 |
| 2013/0162856 | A1* | 6/2013 | Song | G06F 3/04845 348/222.1 |

FOREIGN PATENT DOCUMENTS

JP H08-43918 A 2/1996

* cited by examiner

*Primary Examiner* — Marly Camargo
(74) *Attorney, Agent, or Firm* — Canon USA, Inc., IP Division

(57) ABSTRACT

A video processing apparatus controls an imaging apparatus capable of changing a focus position. A detection unit detects a focus position where a certain object is focused on. A controller controls the imaging apparatus such that a focus position in the imaging apparatus is changed to the focus position where the certain object is focused on which is detected by the detection unit in accordance with a certain operation.

15 Claims, 16 Drawing Sheets

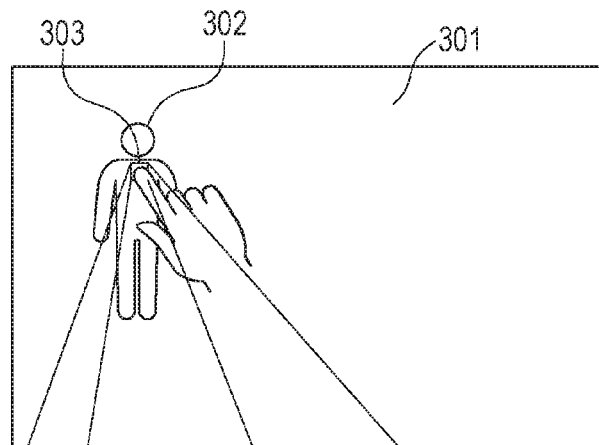
FIG. 3A
FIG. 3B
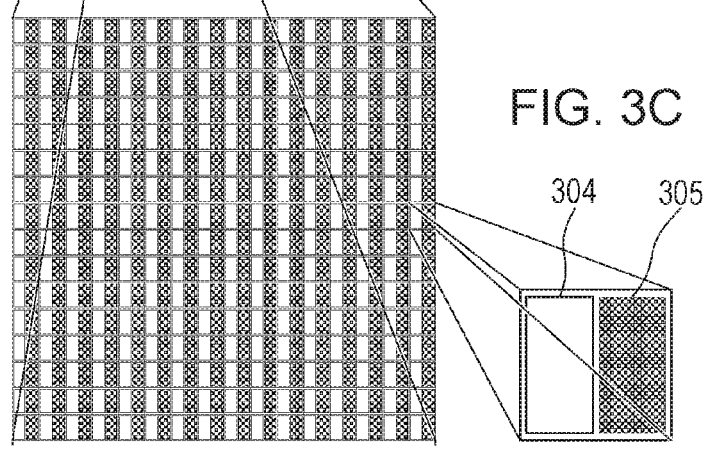
FIG. 3C
FIG. 3D
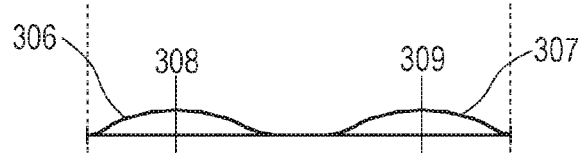
FIG. 3E
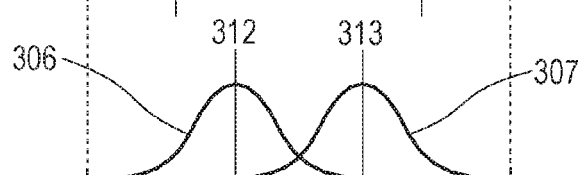
FIG. 3F
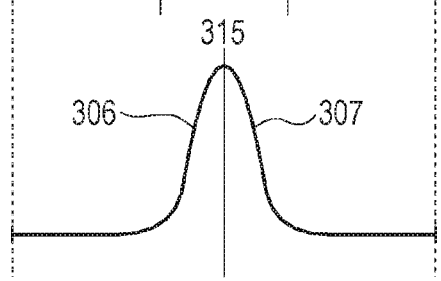

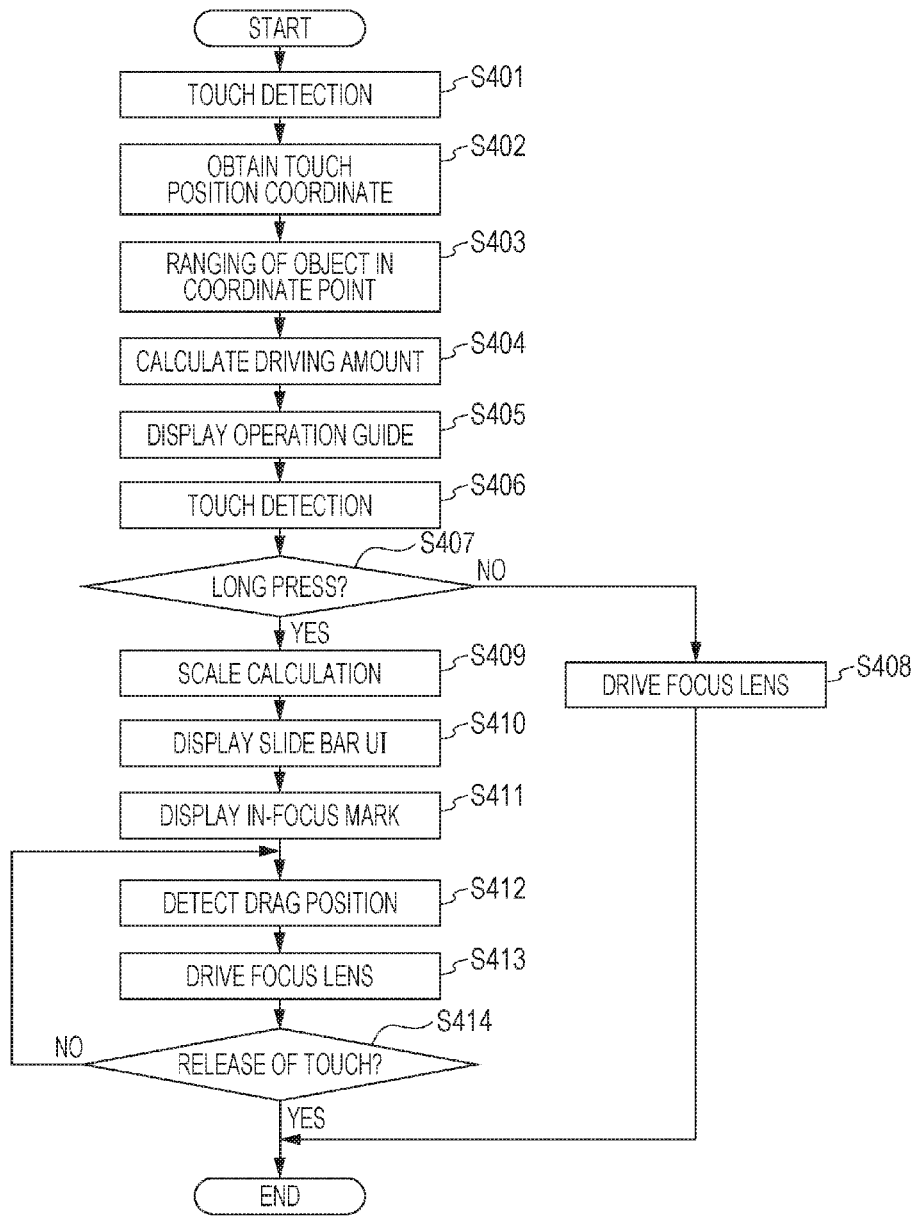

VIDEO PROCESSING APPARATUS, CONTROL METHOD, AND RECORDING MEDIUM

BACKGROUND OF THE INVENTION

Field of the Invention

The present invention relates to a technique of performing focus adjustment on an object to be subjected to imaging by an imaging apparatus.

Description of the Related Art

In general, in a case where focus adjustment is performed on an object to be subjected to imaging by an imaging apparatus, an operator (a user) performs an operation of adjusting a focus using an operation dial, a remote controller, or the like disposed beside a lens of the imaging apparatus. The user performs the operation while checking a degree of focus on the object using a dedicated monitor and directly viewing the object, a surrounding state of the object, and the like. Here, as assistance of the operation of adjusting a focus, the user physically makes a mark of a position of a focus ring at a time of focusing on the object on the focus operation dial or causes the remoter controller to store information on a position of the lens for the focusing. Furthermore, the user manually performs an operation of adjusting a focus while predicting a movement of the object so as to control a process of focusing and a timing of focusing.

To assist the operation of adjusting a focus performed by the user as described above, the following technique has been used.

According to Japanese Patent Laid-Open No. H8-43918, a difference between a current lens position and an in-focus position obtained as a result of ranging is calculated and an in-focus index and at least one dot display element corresponding to an amount of the difference between the current lens position and the ranging result is displayed.

However, when a finder display method disclosed in Japanese Patent Laid-Open No. H8-43918 is employed, the user performs focus adjustment using an operation dial or the like while viewing dot display indicating an in-focus position and dot display indicating a current focus position of the lens, and accordingly, it is difficult for the user to perform a detailed operation.

SUMMARY OF THE INVENTION

To facilitate an operation of adjusting focus on a certain object, the following configuration is provided, for example. Specifically, a video processing apparatus that controls an imaging apparatus capable of changing a focus position includes a detection unit configured to detect a focus position where a certain object is focused on, and a controller configured to control the imaging apparatus such that a focus position in the imaging apparatus is changed to the focus position where the certain object is focused on which is detected by the detection unit in accordance with a certain operation.

Further features of the present invention will become apparent from the following description of exemplary embodiments with reference to the attached drawings.

BRIEF DESCRIPTION OF THE DRAWINGS

FIGS. 3A to 3F are diagrams illustrating an image plane phase difference AF method in detail.

FIG. 4 is a flowchart illustrating a process performed by the video processing apparatus according to a first embodiment.

DESCRIPTION OF THE EMBODIMENTS

Embodiments of the present invention will be described in detail hereinafter with reference to the accompanying drawings. Note that information described in the embodiments below is merely an example, and the present invention is not limited to illustrated configurations. Specifically, the present invention is not limited to the embodiments below, and various modifications and alterations may be made within the scope of the invention.

First Embodiment

Figure 1:
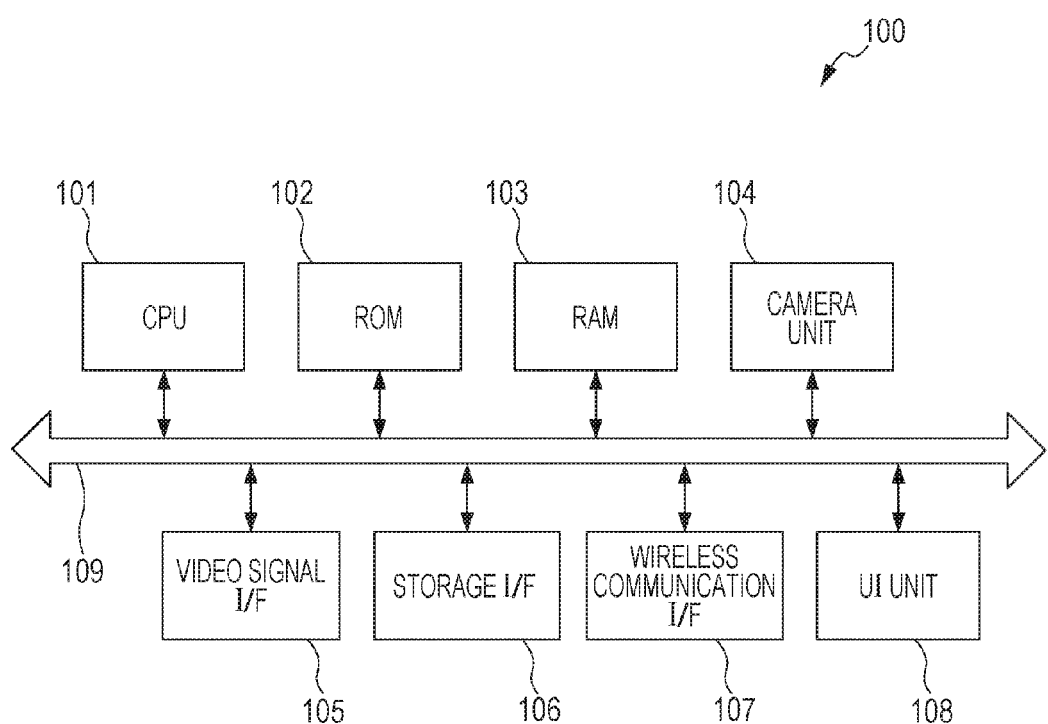
FIG. 1 is a block diagram illustrating a hardware configuration of a video processing apparatus.

FIG. 1 is a diagram illustrating a hardware configuration of a video processing apparatus 100 according to a first embodiment. Note that, instead of the hardware configuration illustrated in FIG. 1, each block in FIG. 1 may be realized by a plurality of circuits, or a plurality of blocks may be realized by a single circuit. Although the video processing apparatus 100 of this embodiment is an imaging apparatus, the present invention is not limited to this. In FIG. 1, a CPU 101 performs a calculation, a logical determination, and the like for various processes and controls components of various units 102 to 108 connected to a bus 109. A ROM 102 stores a program for control to be performed by the CPU 101 which indicates various instructions including a processing procedure of a flowchart described below. A RAM 103 temporarily stores programs and data loaded from an external storage device (not illustrated) or the like, data externally obtained through an interface (I/F), and the like. Note that the RAM 103 may store the program for control to be performed by the CPU 101.

A camera unit 104 has lenses including a focus lens and a zoom lens, a lens driving unit which drives the lenses, an imaging unit which captures an image of an object, and a media processor for graphic processing. The lens driving unit included in the camera unit 104 drives the focus lens in an optical axis of an imaging optical system so as to perform a focus process (focus adjustment) on an object. The imaging unit of the camera unit 104 includes an imaging sensor. The imaging sensor converts an image input from the lens into an electric signal so as to generate a video signal. Furthermore, the imaging sensor of this embodiment serves as a focus detection unit which detects an in-focus state of the optical system. Specifically, the imaging sensor has a configuration in which each pixel corresponds to one micro lens and a plurality of photoelectric conversion units (light receiving elements) and is capable of outputting a phase difference signal and a video signal. The video processing apparatus 100 may detect an in-focus state in accordance with an output phase difference signal. A method for performing a focus process by detecting an in-focus state in accordance with a phase difference signal is referred to as an image plane phase difference auto focus AF method. Note that the image plane phase difference AF method will be described later in detail.

A video signal I/F 105 and a wireless communication I/F 107 are used to connect the video processing apparatus 100 to external apparatuses. The video signal I/F 105 copes with video stream signals. The video signal I/F 105 is connected to an external apparatus through various wired interfaces, for example. Furthermore, the wireless communication I/F 107 transmits and receives a video stream and holds a predetermined band width and at least one channel. For example, the wireless communication I/F 107 is connected to an external apparatus through a wireless interface, for example. A storage I/F 106 stores or caches (temporarily stores) video signals. For example, the storage I/F 106 performs recording of a signal of a captured video image and reading and writing of setting information associated with imaging on a memory card connected to the video processing apparatus 100.

A UI unit 108 forms user interfaces (UIs) of the video processing apparatus 100. The UI unit 108 of this embodiment includes a display unit and an input unit. The display unit is a liquid crystal display, a CRT display, or the like which includes a display screen. The input unit is an operation panel (a touch panel), and includes a sensor used to input a touch operation and a coordinate position of the touch operation on the display screen. When the user performs a touch operation on the display screen of the display unit included in the UI unit 108, the input unit of the UI unit 108 obtains an instruction and information corresponding to the operation performed on the display unit. For example, when the user performs a pinch-out operation on the display screen of the display unit, the input unit of the UI unit 108 may obtain an enlargement instruction corresponding to the pinch-out operation performed on the display unit. By this, the UI unit 108 of this embodiment is realized as an input-output integrated apparatus.

Figure 2:
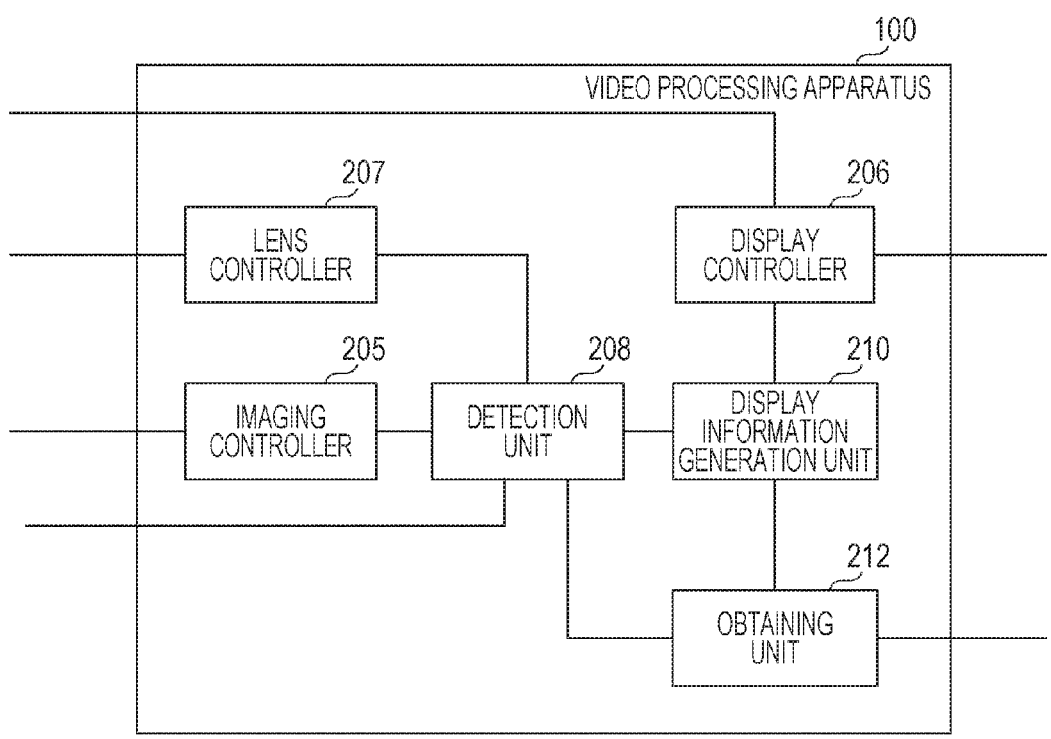
FIG. 2 is a block diagram illustrating a functional configuration of the video processing apparatus.

FIG. 2 is a block diagram illustrating a functional configuration of the video processing apparatus 100 according to this embodiment. Various units in FIG. 2 are realized when the CPU 101 of the video processing apparatus 100 executes programs stored in the ROM 102.

An imaging controller 205 is a processor which controls the imaging unit of the camera unit 104 and controls functions associated with imaging, reproduction, exposure, white balance, and the like performed by the imaging unit.

An obtaining unit 212 obtains information on an operation in accordance with an operation performed by the user which is input to the input unit of the UI unit 108. For example, the obtaining unit 212 obtains information on a position of a designation (a touch) performed by the user on the display screen, information on a period of time in which a touch is continued, and the like as information associated with an operation. A detection unit 208 obtains information on the operation obtained by the obtaining unit 212 and information on the phase difference obtained by the imaging unit. The detection unit 208 detects a lens driving direction and a lens driving amount for focusing on the object corresponding to a position on the display screen specified by the user in accordance with the obtained information on the operation and the obtained information on the phase difference.

A lens controller 207 controls the lens driving unit of the camera unit 104 in accordance with the lens driving direction and the lens driving amount detected by the detection unit 208. A display information generation unit 210 generates information to be displayed in the display unit in accordance with the information on the operation obtained by the obtaining unit 212 and the lens driving direction and the lens driving amount detected by the detection unit 208. Note that the information generated by the display information generation unit 210 will be described later. A display controller 206 is a processing unit which controls the display unit of the UI unit 108. The display controller 206 of this embodiment displays a video image captured by the imaging unit of the camera unit 104 and the information generated by the display information generation unit 210 in the display unit.

Next, the image plane phase difference AF method will be described in detail with reference to FIGS. 3A to 3F. FIG. 3A is a diagram illustrating a state in which an object 302 is displayed on a display screen (an operation screen) 301 of the UI unit 108. As illustrated in FIG. 3A, the user touches a position 303 of the object 302 on the display screen 301. In this state, a process of detecting a focus state performed by the imaging sensor of the imaging unit included in the camera unit 104 of this embodiment will now be described.

FIG. 3B is a diagram illustrating the imaging sensor corresponding to the position 303 on which the touch operation is performed in an enlarged manner. Furthermore, as illustrated in FIG. 3C, in one pixel of the imaging sensor, two light receiving elements, each of which corresponds to one micro lens, are disposed on a left side and a right side as elements 304 and 305, and the elements 304 and 305 function as one light receiving element when imaging is performed.

When the position 303 on the display screen 301 is touched, the imaging sensor of this embodiment extracts information obtained by the elements 304 and 305 in a range of a pixel group corresponding to the position 303 (a range indicated in FIG. 3B).

FIGS. 3D to 3F are diagrams simply illustrating waveforms of signals 306 and 307 received by the elements 304 and 305 for simplicity of description. For example, in a case where the object 302 corresponding to the position 303 is not focused on, signals detected by the elements 304 and 305 in the range of FIG. 3B have peaks in different positions as illustrated in FIG. 3D. Specifically, the peak of the signal 306 received by the element 304 is detected in a position 308, and the peak of the signal 307 received by the element 305 is detected in a position 309 which is shifted from the position 308. In a case where the object 302 is nearly focused on, the signals 306 and 307 detected by the elements 304 and 305 have peaks in positions 312 and 313, respectively, as illustrated in FIG. 3E. Specifically, a difference between the positions of the peaks is smaller than that illustrated in FIG. 3D. Furthermore, in a case where the object 302 is focused on (an in-focus state), the signals 306 and 307 detected by the elements 304 and 305 have peaks in the same position 315 as illustrated in FIG. 3F. Specifically, the positions of the peaks of the signals detected by the elements 304 and 305 coincide with each other.

In this way, the imaging sensor of this embodiment detects a difference (a phase difference) between the peaks of the signals received by the elements 304 and 305 as illustrated in FIGS. 3D and 3E. Then the video processing apparatus 100 may detect a driving amount of the focus lens for focusing on the object 302 in accordance with the phase difference detected by the imaging sensor. Specifically, in FIG. 3D, a driving amount of the focus lens may be detected in accordance with a distance between the position 308 of the peak of the signal 306 received by the element 304 and the position 309 of the peak of the signal 307 received by the element 305. Furthermore, in FIG. 3E, a driving amount of the focus lens may be detected in accordance with a distance between the position 312 of the peak of the signal 306 and the position 313 of the peak of the signal 307. Furthermore, a driving direction of the focus lens may be detected by determining whether the positions of the peaks of the signals received by the elements 304 and 305 are shifted from each other rightward or leftward in FIGS. 3D and 3E. Note that the image plane phase difference AF method is a general technique, and therefore, a description thereof is omitted.

Next, a process performed by the video processing apparatus 100 of this embodiment will be described in detail with reference to FIG. 4 and FIGS. 5A to 5H. FIG. 4 is a flowchart illustrating an operation of performing a focus process on a target (an object) which is subjected to imaging performed by the video processing apparatus 100 according to this embodiment. Furthermore, FIGS. 5A to 5H are diagrams illustrating the display screen (an operation screen) of the UI unit 108 of the video processing apparatus 100 in a case where the video processing apparatus 100 performs the focus process on the object.

First, a process performed by the video processing apparatus 100 will now be described with reference to FIGS. 5A to 5H. Note that, in FIGS. 5A to 5H, a contour of an in-focus portion (a portion having an in-focus degree equal to or higher than a threshold value) is denoted by a solid line and a contour of unfocused portion (a portion having an in-focus degree lower than the threshold value) is denoted by a dotted line. Furthermore, in the contour of the unfocused portion, a portion of the contour having an in-focus degree smaller than the threshold value and equal to or higher than a predetermined value is denoted by a thick dotted line and a portion of the contour having an in-focus degree smaller than the predetermined value is denoted by a fine dotted line.

Figure 5A:
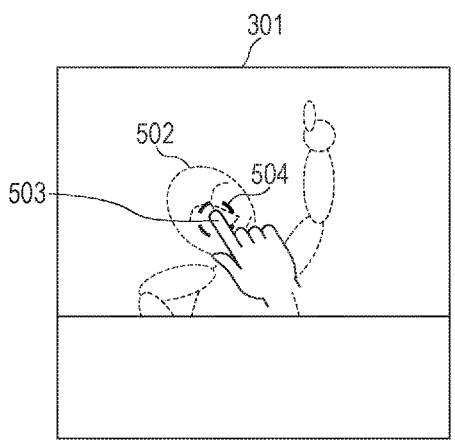
FIGS. 5A to 5H are diagrams illustrating a display screen displayed in a case where focus adjustment is performed according to the first embodiment.

FIG. 5A is a diagram illustrating an image displayed in the display screen 301 of the UI unit 108 in a case where a user performs a touch operation of specifying an object to be focused on. As illustrated in FIG. 5A, an object 502 to be focused on is displayed on the display screen 301. When an operation of specifying the object 502 (a touch operation on the display screen 301 in this embodiment) is performed by the user, the input unit of the UI unit 108 accepts the operation performed by the user. Then the CPU 101 executes a function of the obtaining unit 212 so as to obtain a position 503 on the display screen 301 touched by the user. Thereafter, the CPU 101 executes a function of the display controller 206 so as to display a cursor (an icon) 504 in a position based on the touched position 503 (a position within a predetermined distance from the position 503) on the display screen 301. In this way, by displaying the cursor 504 in the position of the operation on the display screen 301, the specified position is easily recognized by the user.

Figure 5B:
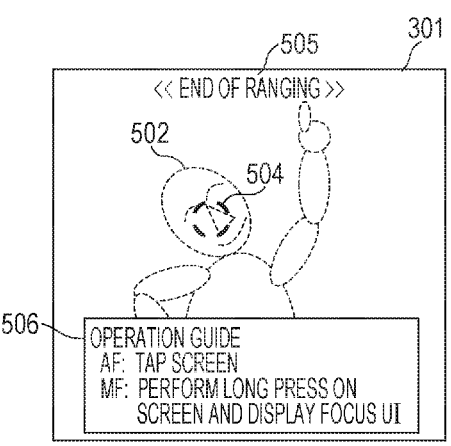

FIG. 5B is a diagram illustrating an image displayed on the display screen 301 in a case where a position of the focus lens of the camera unit 104 is measured when the object 502 corresponding to the position 503 touched by the user is focused on. Specifically, the CPU 101 measures a distance from a position of the focus lens in an optical axis direction before a focus process is performed (a focus position) to a position of the focus lens when the object 502 corresponding to the position 503 is focused on (an in-focus position). Then the CPU 101 calculates a driving direction and a driving amount (the number of driving steps) of the focus lens for focusing on the object 502 in accordance with the measured distance between the focus position and the in-focus position. Note that the calculation of the driving direction and the driving amount of the focus lens is referred to as "ranging". The CPU 101 displays, as illustrated in FIG. 5B, a message 505 indicating that the ranging is completed on the display screen 301. For example, the message 505 is an on-screen-display (OSD) message. Furthermore, the CPU 101 displays an operation guide 506 indicating an operation to be performed next on the display screen 301 to the user as illustrated in FIG. 5B.

Figure 5C:
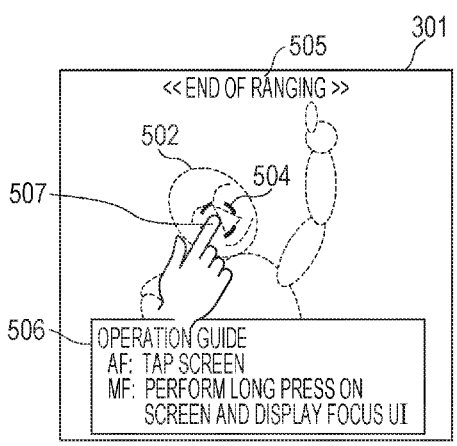
Figure 5D:
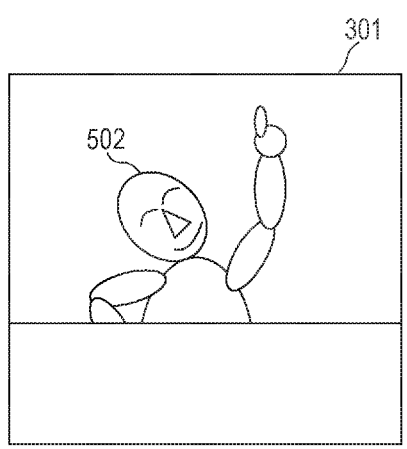

FIG. 5C is a diagram illustrating a state in which the user performs an operation corresponding to the AF in accordance with the operation guide 506. The user performs a tapping operation corresponding to the AF in a position 507 on the display screen 301 in FIG. 5C. FIG. 5D is a diagram illustrating an image displayed on the display screen 301 as a result of the tapping operation performed on the position 507 of FIG. 5C. As illustrated in FIG. 5D, when the tapping operation is performed on the position 507 of FIG. 5C, the object 502 is focused on.

Figure 5E:
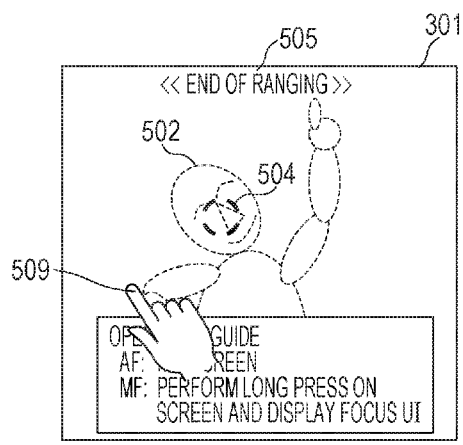
Figure 5F:
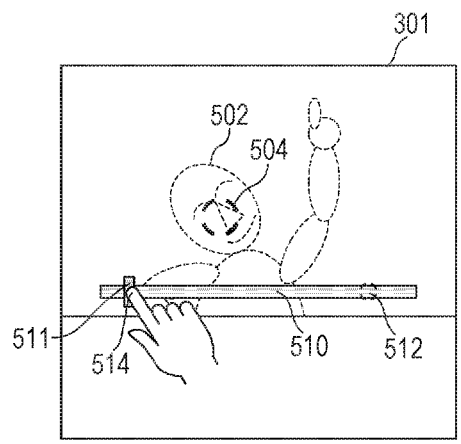

FIG. 5E is a diagram illustrating a state in which the user performs an operation corresponding to manual focus (MF) after the image of FIG. 5B is displayed on the display screen 301. The user performs a long press operation corresponding to the MF in a position 509 of FIG. 5E. Note that the long press operation means an operation of continuously touching a screen within a predetermined distance from a first touch position for a predetermined period of time. FIG. 5F is a diagram illustrating an image displayed on the display screen 301 as a result of the long press operation performed on the position 509 of FIG. 5E. As illustrated in FIG. 5F, a slide bar 510 having a length corresponding to the distance between the pre-focus position and the in-focus position of the focus lens and a handle 511 used to instruct (change) a position of the focus lens in the optical axis direction are displayed on the display screen 301 as UIs to be used in the MF operation. Here, the slide bar 510 is a sliding UI and the handle 511 is a sliding object (an icon or a mark) to be slid. A position of the handle 511 displayed on the display screen 301 after the long press operation corresponds to a position of the focus lens before focus adjustment (the MF process) is performed. Furthermore, an in-focus mark 512 is a graphic (a mark) indicating a position (an in-focus position)

of the focus lens in the optical axis direction when the object 502 corresponding to the position 503 of FIG. 5A touched by the user is focused on.

Note that, although the case where the user performs the long press operation in the position 509 on the display screen 301 is illustrated in FIGS. 5E and 5F, this embodiment may be applied to a case where the long press operation is performed in a position other than the position 509. Specifically, the video processing apparatus 100 displays the handle 511 used to indicate a position of the focus lens in the optical axis direction in a position of the long press operation performed on the display screen 301 in this embodiment. In this way, the user may start an operation of specifying a position of the focus lens from the position where the long press operation is performed.

Figure 5G:
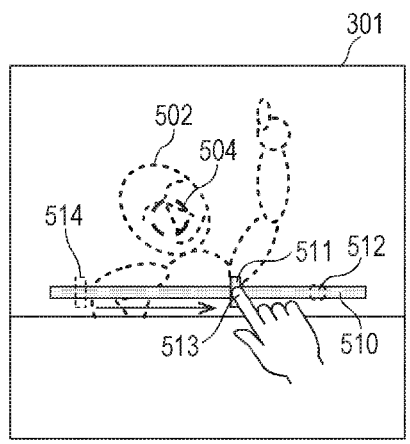
Figure 5H:
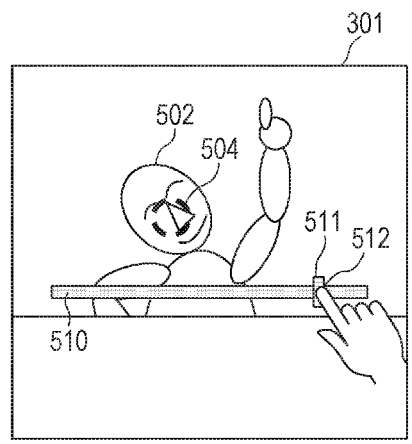

FIG. 5G is a diagram illustrating an image displayed on the display screen 301 when the user performs an operation of moving the handle 511 from a position 514 to a position 513 after the image of FIG. 5F is displayed on the display screen 301. As illustrated in FIG. 5G, a degree of focusing on the object 502 in a case where the handle 511 is in the position 513 is larger than a degree of focusing on the object 502 in a case where the handle 511 is in the position 514 (FIG. 5F) (that is, a dotted line of the contour of the object 502 is thick). FIG. 5H is a diagram illustrating an image displayed on the display screen 301 in a case where the user performs an operation of moving the handle 511 to a position of the in-focus mark 512 which is a position where the object 502 is focused on. As illustrated in FIG. 5H, the object 502 is focused on when the handle 511 is in the position of the in-focus mark 512.

Next, a process performed by the video processing apparatus 100 according to this embodiment will be described in detail with reference to FIG. 4. The video processing apparatus 100 starts a process illustrated in FIG. 4 when the user performs an operation of specifying the object 502 as a target of a focus process as illustrated in FIG. 5A.

In step S401, the UI unit 108 (an input unit) detects (inputs) an operation (a touch operation in this embodiment) performed on the position 503 on the display screen 301 so as to perform the focus process on the target to be imaged (the object 502 of FIG. 5A).

In step S402, the CPU 101 executes a function of the obtaining unit 212 to obtain a position (information on a coordinate of the position 503 of FIG. 5A) on the display screen 301 where the touch operation is detected in step S401.

In step S403, the CPU 101 executes a function of the detection unit 208 so as to obtain a phase difference between signals received by the imaging unit (the two light receiving elements illustrated in FIG. 3C) of the camera unit 104 corresponding to the coordinate obtained in step S402.

In step S404, the CPU 101 executes the function of the detection unit 208. Specifically, the CPU 101 calculates a driving direction and a driving amount (the number of driving steps) of the focus lens for focusing on the object 502 (ranging) in accordance with the phase difference obtained in step S403 and/or a specification of the focus lens of the camera unit 104. Note that, in this embodiment, information on the specification of the focus lens of the camera unit 104 is stored in the RAM 103, and the CPU 101 reads the information on the specification of the focus lens from the RAM 103. However, the present invention is not limited to this, and the information on the specification of the focus lens of the camera unit 104 may be stored in the ROM 102 or a memory (not illustrated) included in the video processing apparatus 100 or an external apparatus (not illustrated) and the CPU 101 may read the information. Furthermore, although, as a configuration in which the imaging sensor serves as an image plane phase difference sensor, the CPU 101 executes the function of the detection unit 208 in step S403 and step S404 so as to calculate a driving direction and a driving amount of the focus lens in this embodiment, the present invention is not limited to this. For example, a driving direction and a driving amount of the focus lens for focusing on a specific object may be calculated using another type of sensor capable of detecting a driving direction and a driving amount of the focus lens.

In step S405, the CPU 101 executes the function of the display controller 206 so as to display the message 505 and the operation guide 506 on the display screen 301 as illustrated in FIG. 5B. Here, the message 505 is a notification indicating that the ranging is completed. Furthermore, the user may visually recognize candidates of a next operation by displaying the operation guide 506.

The UI unit 108 receives an operation performed by the user in step S406, and the CPU 101 executes a function of the obtaining unit 212 so as to determine whether the operation detected in step S406 is a long press operation in step S407.

In step S407, when the detected touch operation is not the long press operation but a tapping operation (an operation of performing pressing for less than a predetermined period of time) as illustrated in FIG. 5C (No in step S407), the video processing apparatus 100 proceeds to step S408 to execute the AF process. In step S408, the lens controller 207 controls driving of the lens driving unit of the camera unit 104 in accordance with the driving direction and the driving amount (the number of driving steps) for focusing calculated in step S404. By performing the process described above, the object 502 is focused on as illustrated in FIG. 5D.

On the other hand, in step S407, when the detected touch operation is the long press operation as illustrated in FIG. 5E (Yes in step S407), the video processing apparatus 100 proceeds to step S409 to execute an MF process. In step S409, the CPU 101 executes a function of the detection unit 208 so as to calculate a driving amount (a step value) corresponding to a distance of a movement of the handle 511 on the display screen 301 (a distance of a dragging operation) moved by the user. The movement of the handle 511 is not limited to the dragging operation and the handle 511 may be moved to a specified destination by performing a tapping operation in a position of the destination. The calculation of a driving amount of the focus lens corresponding to the movement distance of the handle 511 is referred to as a "scale calculation" hereinafter. Furthermore, the video processing apparatus 100 of this embodiment is an input-output integrated apparatus including a display unit and an input unit, and one dot of a resolution on the display screen 301 of the display unit is the same as a unit of operation input by the input unit. Specifically, in a case where an operation of moving the handle 511 by one step is input in the input unit, the display unit displays the handle 511 moved by one dot.

It is assumed that a length of the slide bar (the number of dots of a resolution of the display screen 301) indicating the driving amount of the focus lens is 720 dots on the display screen 301. It is further assumed that a driving amount of the focus lens for focusing calculated in step S404 is 120 steps. In this case, the CPU 101 performs the scale calculation as follows. Specifically, since "720/120=6" is satisfied, the CPU 101 drives the focus lens by one step every time an operation for six dots is input by the input unit. The lens controller 207 controls the lens driving unit so that the focus lens is moved by one step when the handle 511 on the slide bar 510 is operated by six dots.

The scale calculation is not limited to the foregoing method, and even driving amounts may not be assigned to units of operation. Specifically, uneven driving amounts suitable for operation feeling of the user may be assigned. In a case where an operation for one dot is performed in the vicinity of the in-focus position (within a predetermined distance from a cursor indicating the in-focus position) on the slide bar, for example, the focus lens may be driven by one step. Then, in a case where an operation for one dot is performed in another region on the slide bar, the focus lens may be driven by three steps. In this way, by assigning uneven driving amounts, an UI in which a driving amount of the focus lens is instructed in more detail in the vicinity of the in-focus position rather than other regions may be provided. Furthermore, although the CPU 101 controls the lens driving unit such that the focus lens is moved by one step when the six-dot operation is performed by the scale calculation, a driving amount of the focus lens corresponding to the movement distance of the handle 511 is not limited to this. For example, the CPU 101 may perform the scale calculation in accordance with the specification of the focus lens or a driving amount of the focus lens to the in-focus position.

In step S410, the CPU 101 executes the function of the display controller 206 so as to display the UIs for indicating the driving amount of the focus lens (the slide bar 510 and the handle 511 in FIG. 5F) on the display screen 301. In step S411, the CPU 101 executes the function of the display controller 206 so as to display a graphic indicating a position of the focus lens in the optical axis direction for focusing on the object 502 (the in-focus position) specified by the user. Specifically, the CPU 101 displays a graphic (the in-focus mark 512) indicating the in-focus position in a position corresponding to the driving amount of the focus lens for focusing calculated in step S404 on the UI (the slide bar 510 of FIG. 5F) displayed in step S410. As illustrated in FIG. 5F, the CPU 101 determines a range obtained by adding predetermined ranges (allowance) to opposite sides of a range from a position of the handle 511 to a position of the in-focus mark 512 as an operation range of the slide bar 510 for instructing a focus process. By this, a position far from the in-focus position relative to a position of the lens at a time of start of the focus process (a position of the handle 511) may be specified as a position of the lens for defocusing.

In step S412, the input unit of the UI unit 108 detects a dragging operation on the UIs (the handle 511 on the slide bar 510 of FIG. 5F) for indicating a driving amount of the focus lens by the user. Then the CPU 101 executes the function of the obtaining unit 212 so as to obtain a position of the handle 511 for instructing a position of the focus lens on the display screen 301 after the user performs the dragging operation.

In step S413, the CPU 101 executes the function of the detection unit 208 so as to determine a driving direction and a driving amount of the focus lens in accordance with the position of the handle 511 obtained in step S412 and a result of the scale calculation performed in step S409. Thereafter, the CPU 101 executes a function of the lens controller 207 so as to drive the focus lens in the determined driving direction by the determined driving amount. For example, in a case where the position of the handle 511 obtained in step S412 coincides with the position of the in-focus mark 512 indicating the in-focus position, the CPU 101 drives the focus lens to the in-focus position so that the object 502 is focused on.

In step S414, the CPU 101 determines whether the user's operation has been terminated. For example, the CPU 101 determines that the user's operation has been terminated when separation of a user's finger which touched the display screen 301 from the display screen 301 is detected and an operation of instructing a movement of the handle 511 displayed on the display screen 301 is terminated. When the CPU 101 determines that the user's operation has not been terminated in step S414 (No in step S414), the process returns to step S412. On the other hand, when the CPU 101 determines that the user's operation has been terminated in step S414 (Yes in step S414), the focus process is terminated. Specifically, the video processing apparatus 100 of this embodiment repeatedly performs the process from step S412 to step S414 until termination of the dragging operation performed on the UI used by the user to instruct the driving amount of the lens is detected.

By performing the process in FIG. 4 described above, the video processing apparatus 100 of this embodiment may display the UIs (the slide bar and the handle) for specifying a position of the focus lens when the focus process (focus adjustment) is performed on the object. Furthermore, the video processing apparatus 100 may display the graphic (the in-focus mark) indicating the position of the focus lens on the UI when the object is focused on (the in-focus position). By this display, the user may intuitively perform an operation of adjusting focus on the object using the displayed UIs and the displayed in-focus mark.

As described above, according to the video processing apparatus 100 of this embodiment, the operation of adjusting focus until a specific object is focused on may be intuitively performed. Specifically, according to this embodiment, an apparatus which allows the user to easily operate a change of a moving speed of a focus operation until the object is focused on, an in-focus timing, and the like may be provided.

Note that, although the scale calculation is performed while an appropriate length is set as a stroke of an operation on the slide bar UI for focusing in step S409 of FIG. 4 according to this embodiment, an entire range in which the focus lens may be driven may be set as the stroke of the slide bar. With this configuration, the user may operate the focus lens in the entire range in which the focus lens may be driven by operating the handle on the slide bar. Furthermore, with this configuration, the process in step S409 (the scale calculation) may be omitted. Furthermore, both of a slide bar for operating the focus lens in the entire range in which the focus lens may be driven and a slide bar generated based on a result of the scale calculation in step S409 may be displayed. With this configuration, the user may use different slide bars in different cases, that is, a case where the object is focused on at higher speed and a case where the object is gradually focused on (to adjust focus point).

Furthermore, although the video processing apparatus 100 of this embodiment identifies a start of the MF process or the AF process by determining, in step S407, a type of a second touch operation detected in step S406, the start of the MF process or the AF process may be determined by an explicit UI operation. Specifically, a button to be used to start the AF process and a button to be used to display a slide bar for starting the MF process may be provided for the display of the operation guide in step S405.

Furthermore, the video processing apparatus 100 of this embodiment displays the UIs (the slide bar 510 and the handle 511 of FIG. 5F) to be used to instruct a driving amount of the focus lens in step S410 on the display screen 301 after the scale calculation is performed in step S409.

However, the present invention is not limited to the order of the processes, and the scale calculation may be performed after the UIs to be used to instruct a driving amount of the focus lens are displayed.

Second Embodiment

The focus process performed by the video processing apparatus 100 when the single object is specified as a target of the focus process is illustrated in the first embodiment described above. In a second embodiment, a focus process performed by a video processing apparatus 100 in a case where a user specifies a plurality of objects is described.

Figure 6:
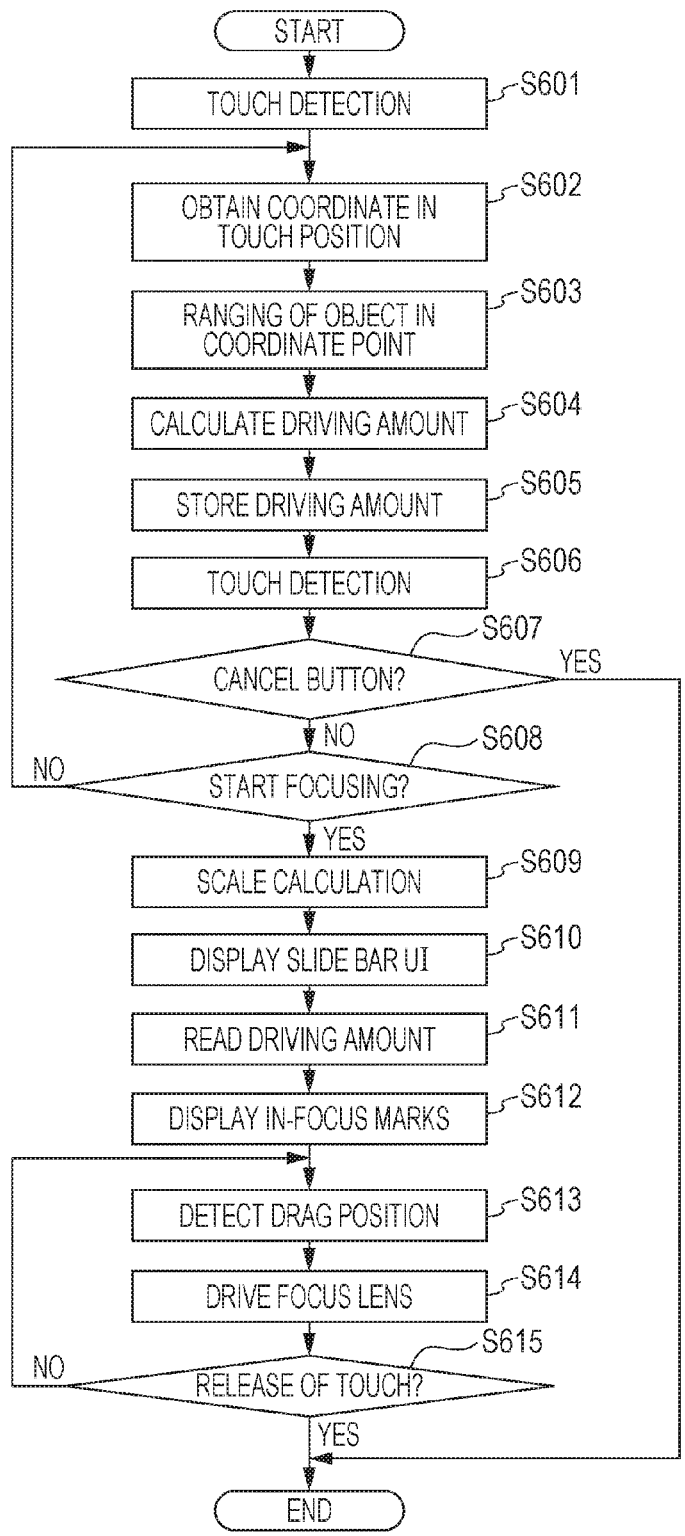
FIG. 6 is a flowchart illustrating a process performed by a video processing apparatus according to a second embodiment.

Hereinafter, a process performed by the video processing apparatus 100 of the second embodiment will be described in detail with reference to FIG. 6 and FIGS. 7A and 7B. FIG. 6 is a flowchart illustrating an operation of performing a focus process on objects performed by the video processing apparatus 100 according to this embodiment. Furthermore, FIGS. 7A and 7B are diagrams illustrating a display screen of an UI unit 108 of the video processing apparatus 100 in a case where the video processing apparatus 100 performs the focus process on the objects.

First, a process performed by the video processing apparatus 100 will be described with reference to FIGS. 7A and 7B. FIG. 7A is a diagram illustrating an image displayed in a display screen 301 of the UI unit 108 in a case where a user performs a touch operation for specifying a plurality of objects to be focused on. As illustrated in FIG. 7A, objects 702 to 704 to be focused on are displayed in the display screen 301. Then, in a case where the user performs a touch operation on the display screen 301 so as to specify the objects 702 to 704, the CPU 101 performs the following process. Specifically, the CPU 101 executes a function of an obtaining unit 212 so as to obtain positions 705 to 707 on the display screen 301 touched by the user. Thereafter, the CPU 101 executes a function of a display controller 206 so as to display cursors 708 to 710 in positions based on the obtained positions 705 to 707 on the display screen 301. A case where the objects 702 to 704 are specified by the user in this order as illustrated in FIG. 7A will be described hereinafter. A button 711 is used to cancel specifying of an object after the object is specified, and a button 712 is used to start an MF process on the specified object.

Figure 7A:
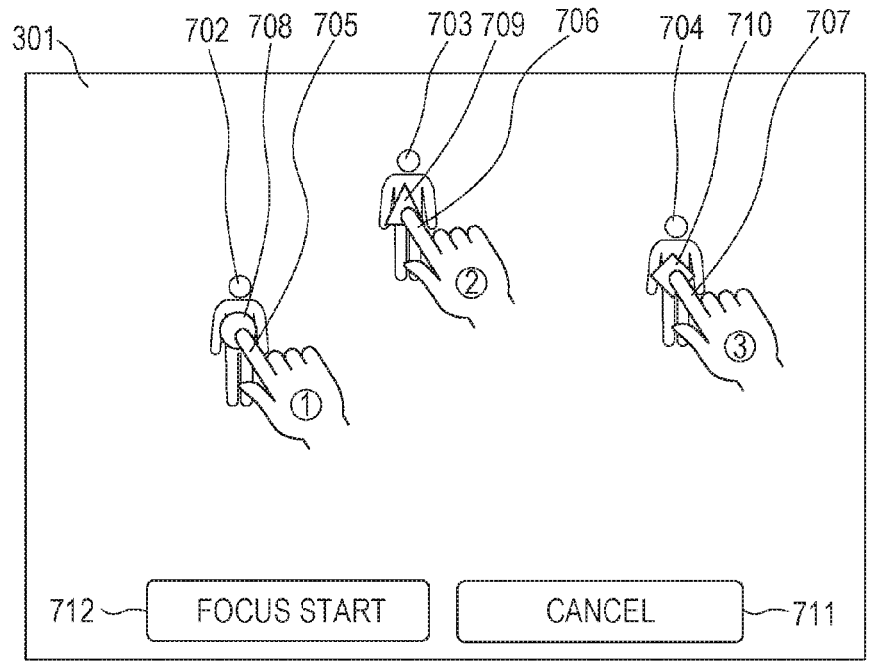
FIGS. 7A and 7B are diagrams illustrating a display screen in a case where focus adjustment is performed according to the second embodiment.
Figure 7B:
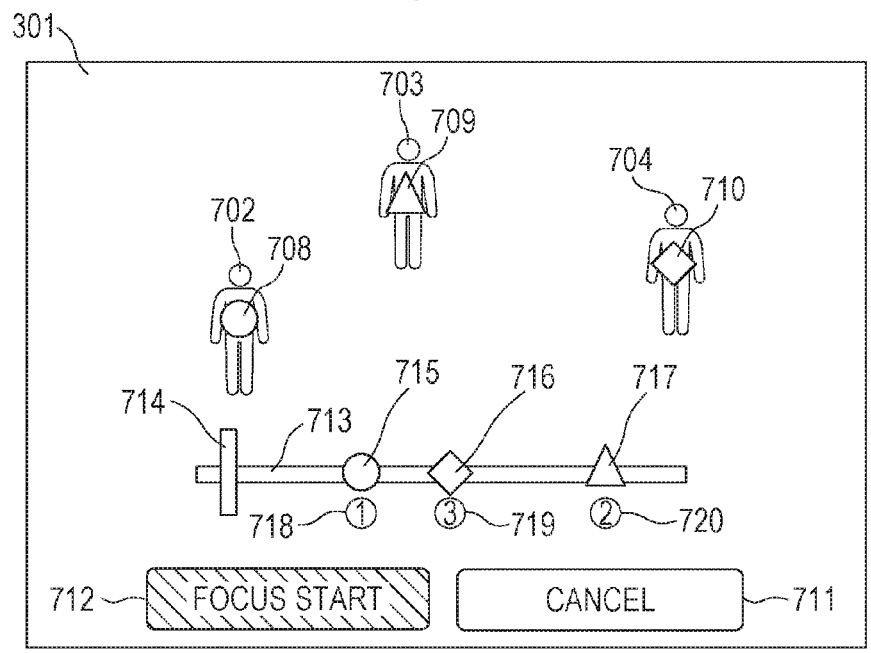

FIG. 7B is a diagram illustrating an image displayed on the display screen 301 in a case where the button 712 is operated so that the MF process is started after the objects 702 to 704 are specified as illustrated in FIG. 7A. As illustrated in FIG. 7B, a slide bar 713 having a length corresponding to a distance between a focus position and an in-focus position of the focus lens and a handle 714 used to instruct (change) a position of the focus lens in an optical axis direction are displayed on the display screen 301 as UIs to be used for the MF process. Furthermore, in-focus marks 715 to 717 are graphics indicating the positions (the in-focus positions) of the focus lens in the optical axis direction in a case where the objects 702 to 704 corresponding to the positions 705 to 707 of FIG. 7A touched by the user are focused on. Furthermore, marks 718 to 720 indicate sequential numbers of the objects 702 to 704 specified by the user. Furthermore, when the user operates the button 712 in the state of FIG. 7A, the button 712 illustrated in FIG. 7B is displayed such that it is recognized that the MF process is started.

Next, a process performed by the video processing apparatus 100 according to this embodiment will be described in detail with reference to FIG. 6. The video processing apparatus 100 starts the process illustrated in FIG. 6 when the user performs an operation of specifying an object to be subjected to the focus process (for example, at least one of the objects 702 to 704) as illustrated in FIG. 7A.

A process from step S601 to step S604 in FIG. 6 is the same as the process from step S401 to step S404 of FIG. 4 according to the first embodiment, and therefore, a description thereof is omitted. First, it is assumed that, in step S601, the UI unit 108 detects a touch operation performed on a position (the position 705 of FIG. 7A) on the display screen 301 so as to perform the focus process on the object 702 of FIG. 7A to be imaged. In this case, in step S604, the CPU 101 executes a function of a display controller 208 so as to calculate a driving direction and a driving amount of the focus lens (ranging) for focusing on the object 702 which is specified first.

In step S605, the CPU 101 stores the driving amount of the focus lens calculated in step S604 which is associated with the object 702 in a ROM 102, a RAM 103, or another memory (not illustrated). Thereafter, the CPU 101 executes the function of the display controller 206 so as to display the cursor 708 unique to the object 702 in the touched position 705 on the display screen 301 as illustrated in FIG. 7A.

In step S606, the UI unit 108 detects a next operation performed by the user. In step S607, the CPU 101 executes a function of the detection unit 208 so as to determine whether the operation detected in step S606 is an operation of cancelling the specifying of the object performed in step S601 (an operation corresponding to the button 711). When it is determined that the operation detected in step S606 is an operation of cancelling the specifying of the object in step S607 (Yes in step S607), the video processing apparatus 100 terminates the focus process. On the other hand, when it is determined that the operation detected in step S606 is not an operation of cancelling the specifying of the object in step S607 (No in step S607), the video processing apparatus 100 proceeds to a process in step S608.

In step S608, the CPU 101 executes the function of the detection unit 208 so as to determine whether the operation detected in step S606 is an operation of starting the MF process to be performed on the object specified in step S601 (an operation corresponding to the button 712). When it is determined that the operation detected in step S606 is an operation of starting the MF process to be performed on the object in step S608 (Yes in step S608), the video processing apparatus 100 proceeds to a process in step S609. On the other hand, when it is determined that the operation detected in step S606 is not an operation of starting the MF process to be performed on the object in step S608 (No in step S608), the video processing apparatus 100 returns to the process in step S602. If the operation detected in step S606 is not the operation of starting the MF process but an operation of specifying a next target to be subjected to the focus process (the object 703 in FIG. 7A, for example), for example, the video processing apparatus 100 performs the process from step S602 to step S605. Specifically, the CPU 101 stores the driving amount of the focus lens calculated in step S604 associated with the object 703 and displays the cursor 709 unique to the object 703 in the position 706 on the display screen 301 as illustrated in FIG. 7A. The video processing apparatus 100 performs the same process even in a case where an operation of specifying the object 704 of FIG. 7A as the next target to be subjected to the focus process is performed. Specifically, the CPU 101 stores the driving amount of the focus lens calculated in step S604 associated with the object 704 and displays the cursor 710 unique to the object 704 in the position 707 on the display screen 301 as illustrated in FIG. 7A.

On the other hand, if the button 712 is operated, the CPU 101 executes the function of the detection unit 208 so as to perform a scale calculation in accordance with the largest one of driving amounts of the focus lens of the specified objects in step S609. Here, the CPU 101 calculates the scale calculation based on the driving amount of the focus lens of the object 703, among the specified objects 702 to 704, which is the largest one of the driving amounts of the focus lens. By the scale calculation performed in step S609, the video processing apparatus 100 may generate a UI (the slide bar 713 of FIG. 7B) used to specify a driving amount of the focus lens when the focus process is performed on the objects 702 to 704.

In step S610, the CPU 101 executes the function of the display controller 206. Specifically, the CPU 101 displays the UIs for indicating the driving amount of the focus lens (the slide bar 713 and the handle 714 in FIG. 7B) on the display screen 301 in accordance with a result of the scale calculation in step S609. In step S611, the CPU 101 reads the driving amounts (the number of driving steps) of the focus lens corresponding to the plurality of objects (the objects 702 to 704) stored in step S605.

In step S612, the CPU 101 executes the function of the display controller 206. Then the CPU 101 displays graphics indicating positions (in-focus positions) of the focus lens in the optical axis direction for focusing on the objects 702 to 704 in accordance with the driving amounts (the numbers of driving steps) of the focus lenses read in step S611. Specifically, the CPU 101 displays graphics (in-focus marks 715 to 717) in positions corresponding to the driving amounts of the focus lens for focusing calculated in step S604 on the UI (the slide bar 713 of FIG. 7B) displayed in step S610. Note that, as illustrated in FIG. 7B, the in-focus marks 715 to 717 have shapes the same as those of the cursors 708 to 710 unique to the objects 702 to 704, respectively, displayed in FIG. 7A. Thereafter, a process from step S613 to step S615 is the same as the process from step S412 to step S414 of FIG. 4 according to the first embodiment, and therefore, a description thereof is omitted.

By performing the process in FIG. 6 described above, the video processing apparatus 100 of this embodiment may display UIs (the slide bar and the handle) for specifying positions of the focus lens in a case where the focus process (focus adjustment) is performed on the plurality of objects. Furthermore, the video processing apparatus 100 may display graphics (in-focus marks) indicating positions (in-focus positions) of the focus lens on the UI when the objects are focused on. By this display, the user may intuitively perform an operation of adjusting focus on the objects using the displayed UIs and the displayed in-focus marks. Furthermore, even in the case where a plurality of objects are specified, the user may reliably operate the objects to be subjected to focus adjustment while visually recognizing the in-focus marks corresponding to the objects.

As described above, according to the video processing apparatus 100 of this embodiment, the operation of focus adjustment may be intuitively performed until specific objects are focused on. Specifically, according to this embodiment, an apparatus which allows the user to easily operate a change of a moving speed of a focus operation until the object is focused on, an in-focus timing, and the like may be provided.

Furthermore, in a case where the user specifies a plurality of objects to be subjected to the focus adjustment, the video processing apparatus 100 of this embodiment displays graphics (in-focus marks) indicating positions of the focus lens for focusing on the objects and marks indicating specified sequential numbers. By this display, even in a case where the user specifies a plurality of objects, the user may perform an operation of adjusting focus on the plurality of objects in a reliable order of the objects.

Third Embodiment

In the second embodiment described above, the video processing apparatus 100 performs the MF process by arranging the in-focus marks 715 to 717 corresponding to the plurality of objects on the single slide bar 713 as illustrated in FIG. 7B. In a third embodiment, a video processing apparatus 100 displays in-focus marks corresponding to a plurality of objects specified by a user in positions based on positions of the objects on a display screen 301 as illustrated in FIG. 9.

Figure 8:
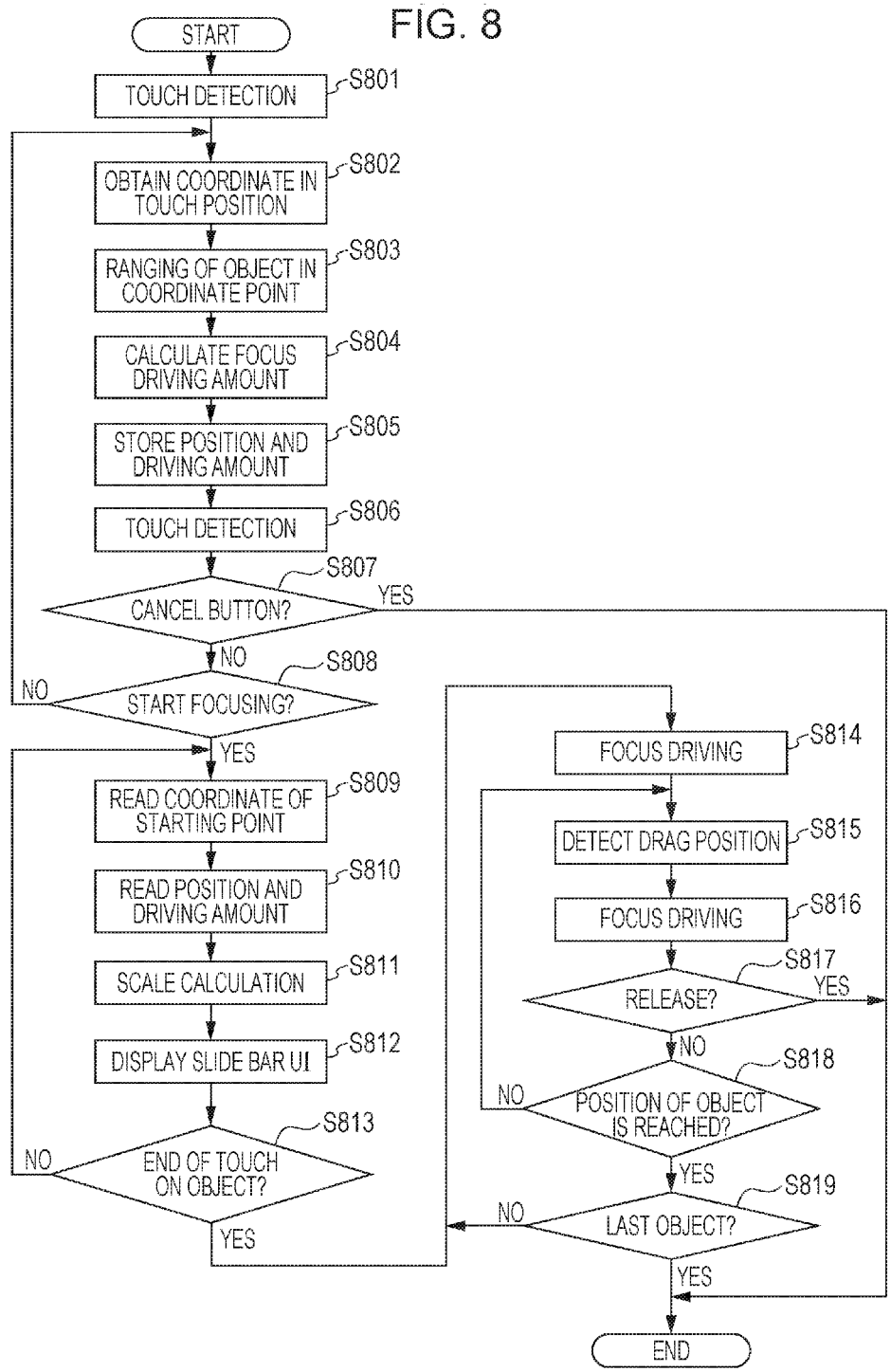
FIG. 8 is a flowchart illustrating a process performed by a video processing apparatus according to a third embodiment.

Hereinafter, a process performed by the video processing apparatus 100 of the third embodiment will be described in detail with reference to FIGS. 8 and 9. FIG. 8 is a flowchart illustrating an operation of performing a focus process on objects performed by the video processing apparatus 100 according to the third embodiment. Furthermore, FIG. 9 is a diagram illustrating the display screen 301 in a display unit of an UI unit 108 of the video processing apparatus 100 in a case where the video processing apparatus 100 performs the focus process on the objects.

First, a process performed by the video processing apparatus 100 will be described with reference to FIG. 9. Note that, in this embodiment, an image displayed on a display screen 301 of the UI unit 108 when a user performs a touch operation for specifying a plurality of objects to be focused on is the same as that of the second embodiment illustrated in FIG. 7A.

Figure 9:
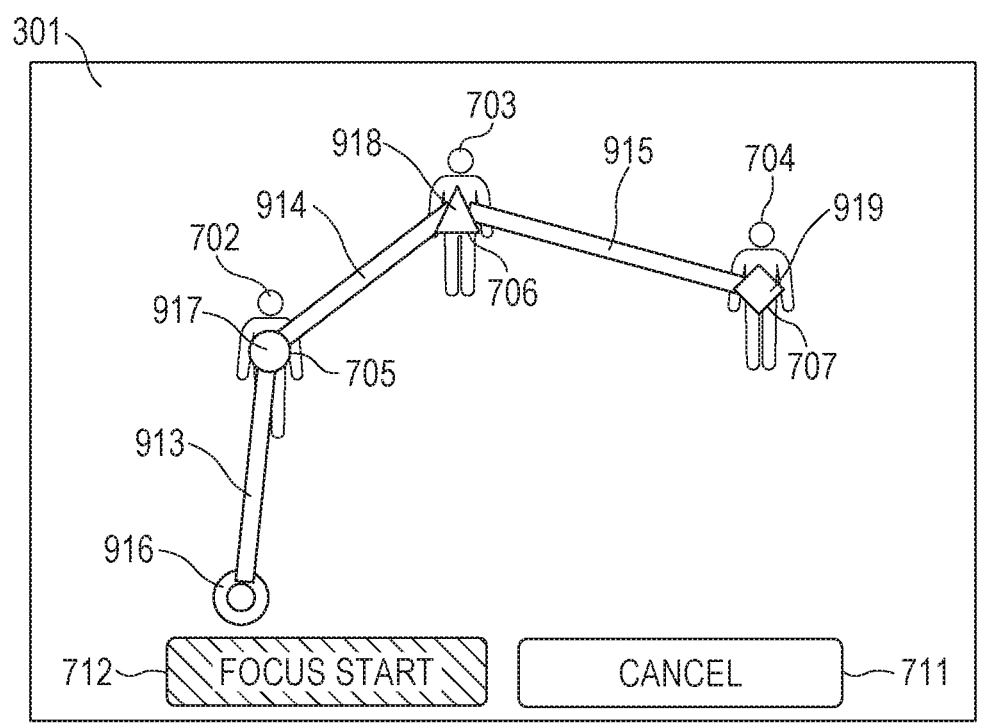
FIG. 9 is a diagram illustrating a display screen displayed in a case where focus adjustment is performed according to the third embodiment.

FIG. 9 is a diagram illustrating an image displayed on the display screen 301 when the button 712 is operated so that the MF process is started after objects 702 to 704 are specified as illustrated in FIG. 7A. Here, as illustrated in FIG. 9, in-focus marks 917 to 919 indicating positions of the focus lens in an optical axis direction (in-focus positions) when the objects 702 to 704 corresponding to positions 705 to 707 of FIG. 7A touched by the user are focused on are displayed. Furthermore, a slide bar 913 is displayed between a handle 916 indicating a position of the focus lens in the optical axis direction and an in-focus mark 917. Furthermore, a slide bar 914 is displayed between the in-focus mark 917 and an in-focus mark 918, and a slide bar 915 is displayed between the in-focus mark 918 and an in-focus mark 919. Furthermore, when the user operates a button 712 illustrated in FIG. 9 in a state of FIG. 7A, the button 712 illustrated in FIG. 9 is displayed such that it is recognized that the MF process is started.

Next, a process performed by the video processing apparatus 100 according to this embodiment will be described in detail with reference to FIG. 8. The video processing apparatus 100 starts the process illustrated in FIG. 8 when the user performs an operation of specifying an object to be subjected to the focus process (for example, at least one of the objects 702 to 704) as illustrated in FIG. 7A.

A process from step S801 to step S804 in FIG. 8 is the same as the process from step S401 to step S404 of FIG. 4 according to the first embodiment and the process from step S601 to step S604 of FIG. 6 according to the second embodiment, and therefore, a description thereof is omitted. First, it is assumed that, in step S801, the UI unit 108 detects a touch operation performed on a position (the position 705 of FIG. 7A) on the display screen 301 so as to perform the focus process on the object 702 of FIG. 7A to be imaged. In this case, in step S804, the CPU 101 executes a function of a display controller 208 so as to calculate a driving direction and a driving amount of the focus lens (ranging) for focusing on the object 702 which is specified first. Here, the calculated driving amount corresponds to an amount of driving of the focus lens obtained when the focus lens is driven from an initial position (a pre-focus position) of the focus lens (before the focus process is started) in the optical axis direction to a position (an in-focus position) of the focus lens when the object 702 is focused on.

In step S805, the CPU 101 stores a position of the object 702 on the display screen 301 specified by the user and the focus driving amount (the number of driving steps) calculated in step S804 in a ROM 102, a RAM 103, or another memory (not illustrated).

In step S806, the UI unit 108 detects a next operation performed by the user. In step S807, the CPU 101 executes the function of the detection unit 208 so as to determine whether the operation detected in step S806 is an operation of cancelling the specifying of the object performed in step S801 (an operation corresponding to the button 711). When it is determined that the operation detected in step S806 is the operation of cancelling the specifying of the object in step S807 (Yes in step S807), the video processing apparatus 100 terminates the focus process. On the other hand, when it is determined that the operation detected in step S806 is not the operation of cancelling the specifying of the object in step S807 (No in step S807), the video processing apparatus 100 proceeds to a process in step S808.

In step S808, the CPU 101 executes the function of the detection unit 208 so as to determine whether the operation detected in step S806 is an operation of starting the MF process to be performed on the object specified in step S801 (an operation corresponding to the button 712).

Here, a case where the operation detected in step S806 is an operation of specifying a next target to be subjected to the MF process (the object 703 of FIG. 7A, for example) in step S808 will be described hereinafter. In this case, the video processing apparatus 100 performs a process from step S802 to step S804 on the object 703. In step S805, the CPU 101 stores the following information in the ROM 102, the RAM 103, or the other memory (not illustrated). Specifically, the CPU 101 stores a position of the newly-specified object 703 on the display screen 301 and a difference between a driving amount of the focus lens for focusing on the object 702 specified immediately before and a driving amount of the focus lens calculated in step S804. Furthermore, when an operation of specifying the next object 704 to be subjected to the MF process is detected in step S806, the video processing apparatus 100 executes the process from step S802 to step S805 on the object 704 similarly to the process performed on the object 703.

After the process from step S802 to step S805 is performed on the objects 702 to 704, the UI unit 108 detects an operation of starting the MF process performed by the user (an operation performed on the button 712) in step S806. In this case, the video processing apparatus 100 performs a process in step S807 and step S808, and proceeds to step S809.

In step S809, the CPU 101 reads a position of a starting point on the slide bar (here, a position of the handle 916) for specifying a driving amount of the focus lens. In step S810, the CPU 101 reads the position 705 on which a touch operation is performed on the first object 702 specified by the user and a driving amount (the number of driving steps) of the focus lens for focusing on the first object 702.

In step S811, the CPU 101 executes the function of the detection unit 208 so as to perform a scale calculation. Note that, in step S811, the CPU 101 determines a distance from the position of the starting point (the position of the handle 916) read in step S809 to the position (the position 705) corresponding to the first object 702 read in step S810 as a length of the slide bar 913. Furthermore, the CPU 101 determines a step value of the driving amount of the focus lens corresponding to a movement amount of the handle 916 on the slide bar 913 in accordance with the driving amount of the focus lens read in step S810.

In step S812, the CPU 101 generates the slide bar 913 based on the information obtained by the process from step S809 to step S811 and displays the slide bar 913 on the display screen 301 as illustrated in FIG. 9.

In step S813, the CPU 101 determines whether UIs for the MF process to be performed on all the objects specified by the user have been generated and displayed. Here, the generation and the display of the UIs for instructing the MF process to be performed on the objects 703 and 704 have not been completed (No in step S813), and therefore, the video processing apparatus 100 returns to the process in step S809. Thereafter, in step S809, the CPU 101 reads a position of a starting point of the slide bar 913 (here, the position 705 of the object 702 which is specified immediately before) for instructing the MF process to be performed on the next object 703. In step S810, the CPU 101 reads the position 706 where the touch operation is performed on the second object 703 specified by the user. Furthermore, in step S810, the CPU 101 reads a difference value between the driving amount of the focus lens for focusing on the object 703 stored in step S805 and the driving amount of the focus lens for focusing on the object 702.

In step S811, the CPU 101 determines a distance from the position of the starting point (the position 705 of the object 702) read in step S809 to the position (the position 706) corresponding to the object 703 read in step S810 as a length of the slide bar 914. Furthermore, the CPU 101 determines a step value of the driving amount of the focus lens corresponding to a movement amount of the handle 916 on the slide bar 914 in accordance with the driving amount of the focus lens read in step S810. In step S812, the CPU 101 generates the slide bar 914 based on the information obtained by the process from step S809 to step S811 and displays the slide bar 914 on the display screen 301 as illustrated in FIG. 9.

Also in step S813, the generation and the display of the UIs for instructing the MF process to be performed on the object 704 have not been completed (No in step S813), and therefore, the video processing apparatus 100 returns to the process in step S809. In step S809, the CPU 101 reads a position of a starting point of the slide bar 915 (here, the position 706 of the object 703 which is specified immediately before) for instructing the MF process to be performed on the next object 704. Thereafter, the video processing apparatus 100 executes the process from step S810 to step S812 on the object 704 similarly to the process performed on the object 703. By this process, the CPU 101 may display the slide bar 915 on the display screen 301 as illustrated in FIG. 9.

After the process from step S809 to step S812 is performed on the objects 702 to 704, the CPU 101 determines that the UIs for the MF process to be performed on all the specified object have been generated and displayed in step S813 (Yes in step S813). Then the video processing apparatus 100 proceeds to a process in step S814.

In step S814, the CPU 101 obtains (sets) a step value of the driving amount of the focus lens calculated in step S811 on the slide bar 913 which is generated first. In step S815, the CPU 101 detects a movement amount of the handle 916 on the slide bar 913. In step S816, the CPU 101 determines a driving amount of the focus lens in accordance with the movement amount of the handle 916 on the slide bar 913 detected in step S815. Thereafter, the CPU 101 drives the focus lens by the determined driving amount. In step S817, as with step S414 of FIG. 4 according to the first embodiment, the CPU 101 determines whether the user's operation has been terminated.

Specifically, the CPU 101 determines that the user's operation has been terminated when separation of a user's finger which touched the display screen 301 from the display screen 301 is detected and an operation of instructing a movement of the handle 916 displayed on the display screen 301 is terminated. When the CPU 101 determines that the user's operation has been terminated in step S817 (Yes in step S817), the focus process is terminated. On the other hand, when the CPU 101 determines that the user's operation has not been terminated in step S817 (No in step S817), the video processing apparatus 100 proceeds to a process in step S818.

In step S818, the CPU 101 determines whether the handle 916 has reached an in-focus mark (here, the in-focus mark 917) serving as an end point of the slide bar on which the handle 916 is moving (here, the slide bar 913). When it is determined that the handle 916 has not reached the in-focus mark of the end point in step S818 (No in step S818), the video processing apparatus 100 performs the process from S815 to step S818 again. Then the video processing apparatus 100 performs the MF process on the object (the object 702) on the end point on the slide bar on which the handle 916 is moving (the slide bar 913). On the other hand, when it is determined that the handle 916 has reached the in-focus mark of the end point in step S818 (Yes in step S818), the video processing apparatus 100 proceeds to a process in step S819.

In step S819, the CPU 101 determines whether the object corresponding to the in-focus mark reached by the handle 916 in step S818 is a final object specified by the user. Specifically, the CPU 101 determines whether the process from step S814 to step S818 has been performed on all the objects specified by the user. Here, the process has not been performed on the objects 903 and 904 (No in step S819), and therefore, the video processing apparatus 100 returns to the process in step S814. In step S814, the CPU 101 obtains (sets) a step value of the driving amount of the focus lens calculated in step S811 on the slide bar 914 which is generated next. Thereafter, the video processing apparatus 100 repeatedly performs the process from step S815 to step S818 until the handle 916 on the slide bar 914 reaches the in-focus mark (here, the in-focus mark 918 corresponding to the object 703) serving as the end point of the slide bar 914.

Furthermore, the CPU 101 determines that the process has not been performed on the object 704 in step S819, and therefore, the video processing apparatus 100 performs the process from step S815 to step S818 on the object 704 similarly to the process performed on the object 703. Thereafter, in step S819, the CPU 101 determines that the process from step S814 to S818 has been performed on all the objects specified by the user (Yes in step S819), and the focus process is terminated.

By performing the process described above in FIG. 8, the video processing apparatus 100 of this embodiment may display the UIs (the slide bar and the handle) for specifying a position of the focus lens in a case where the focus process (focus adjustment) is performed on the objects. Furthermore, the video processing apparatus 100 may display graphics (in-focus marks) indicating positions (in-focus positions) of the focus lens on the UI when the objects are focused on in positions of the objects displayed on the display screen. By this display, the user may intuitively perform an operation of adjusting focus on the object using the displayed UIs and the displayed in-focus mark.

As described above, according to the video processing apparatus 100 of this embodiment, the operation of adjusting focus until a specific object is focused on may be intuitively performed. Specifically, according to this embodiment, an apparatus which allows the user to easily operate a change of a moving speed of a focus operation until the object is focused on, an in-focus timing, and the like may be provided.

Furthermore, the video processing apparatus 100 of this embodiment displays the UIs (the slide bars) having starting points and/or end points in positions of the objects on the display screen in a specified order in positions between the objects in accordance with the positions of the specified objects on the display screen. By this display, the user may perform an operation of adjusting focus while visually recognizing the order of the focus process and positions of the focus lens until the focus lens reaches in-focus positions corresponding to the objects.

Fourth Embodiment

In the third embodiment described above, the video processing apparatus 100 displays the slide bars as line segments for instructing the driving amounts of the focus lens in positions between the plurality of objects specified by the user as illustrated in FIG. 9. In a fourth embodiment, a video processing apparatus 100 displays a slide bar as a curved line in accordance with a distance between a plurality of specified objects in a case where the slide bar is displayed between the plurality of objects as illustrated in FIG. 11B.

Figure 10:
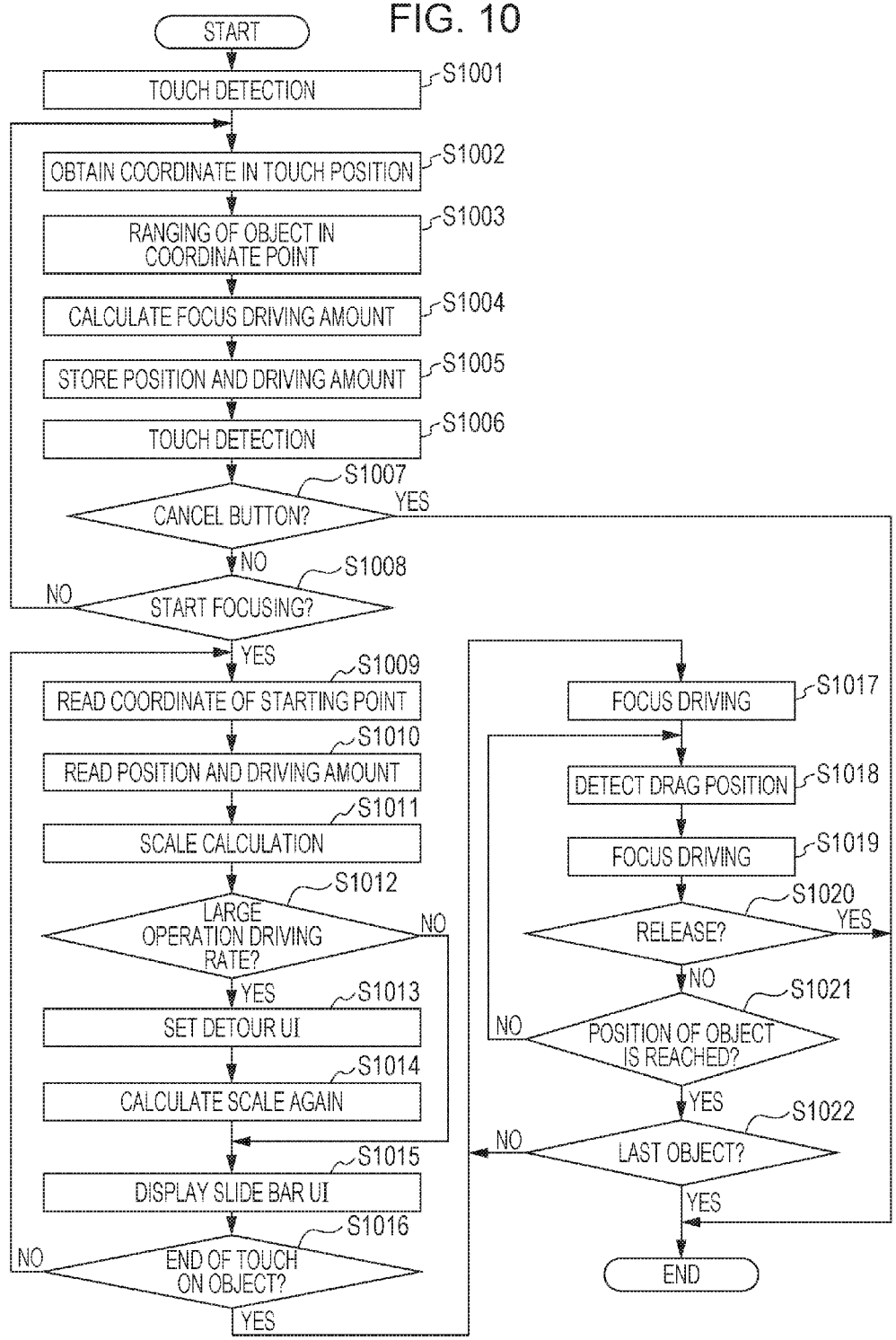
FIG. 10 is a flowchart illustrating a process performed by a video processing apparatus according to a fourth embodiment.

Hereinafter, a process performed by the video processing apparatus 100 of the fourth embodiment will be described in detail with reference to FIG. 10 and FIGS. 11A and 11B. FIG. 10 is a flowchart illustrating an operation of performing a focus process on objects performed by the video processing apparatus 100 according to the fourth embodiment. Furthermore, FIGS. 11A and 11B are diagrams illustrating a display screen of an UI unit 108 of the video processing apparatus 100 in a case where the video processing apparatus 100 performs the focus process on the objects.

First, a process performed by the video processing apparatus 100 will be described with reference to FIGS. 11A and 11B. In FIG. 11A of this embodiment, components the same as those of FIG. 7A of the second embodiment are denoted by reference numerals the same as those of FIG. 7A and descriptions thereof are omitted. FIG. 11A of this embodiment is different from FIG. 7A of the second embodiment in that a position 1106 corresponds to an object 703 on the display screen 301.

Figure 11A:
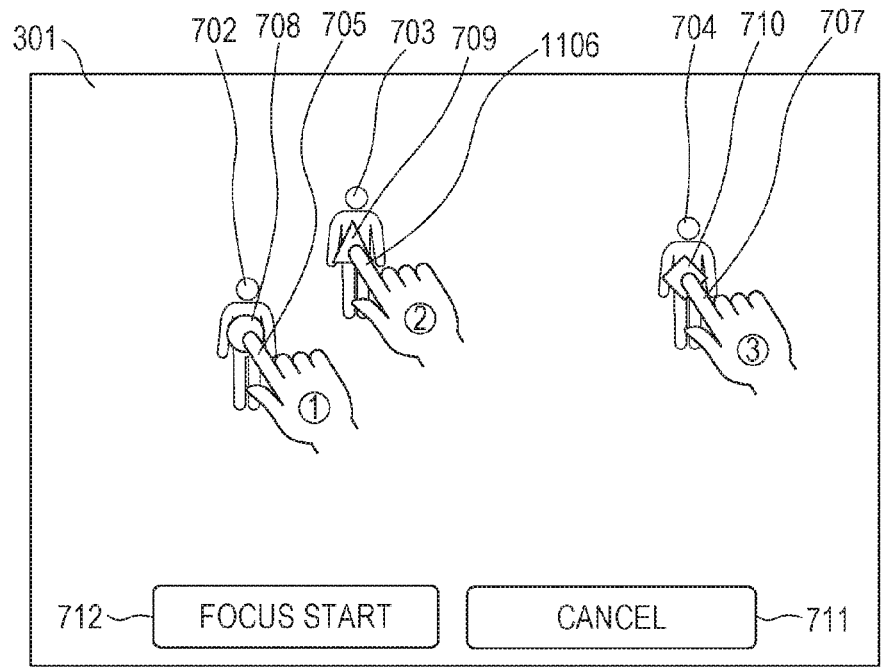
FIGS. 11A and 11B are diagrams illustrating a display screen displayed in a case where focus adjustment is performed according to the fourth embodiment.
Figure 11B:
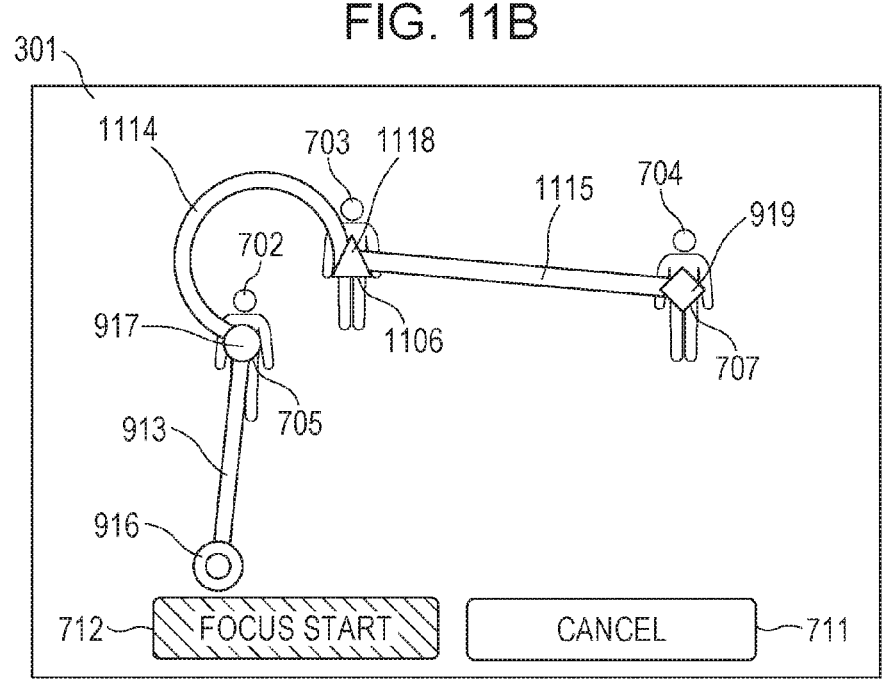

FIG. 11B is a diagram illustrating an image displayed on the display screen 301 in a case where the button 712 is operated so that an MF process is started after objects 702 to 704 are specified as illustrated in FIG. 11A. In FIG. 11B of this embodiment, components the same as those of FIG. 9 of the third embodiment are denoted by reference numerals the same as those of FIG. 9 and descriptions thereof are omitted. FIG. 11B of this embodiment is different from FIG. 9 of the third embodiment in that the position 1106 corresponds to the object 703 on the display screen 301. Furthermore, FIG. 11B is different from FIG. 9 in that an in-focus mark 1118 indicating a position (an in-focus position) of the focus lens in an optical axis direction in a case where the object 703 corresponding to the position 1106 is focused on is displayed. Furthermore, FIG. 11B is different from FIG. 9 in that a slide bar 1114 is displayed in a position between an in-focus mark 917 and an in-focus mark 1118, and a slide bar 1115 is displayed in a position between the in-focus mark 918 and an in-focus mark 919. The slide bar 1114 illustrated in FIG. 11B is different from the slide bar 914 of FIG. 9 in that the slide bar 1114 is formed by a curved line (a detour), instead of the line segment, between the position 705 corresponding to the object 702 and the position 1106 corresponding to the object 703.

Next, a process performed by the video processing apparatus 100 according to this embodiment will be described in detail with reference to FIG. 10. The video processing apparatus 100 starts the process illustrated in FIG. 10 when the user performs an operation of specifying an object to be subjected to the focus process (for example, at least one of the objects 702 to 704) as illustrated in FIG. 11A. A process from step S1001 to step S1011 in FIG. 10 is the same as the process from step S801 to step S811 of FIG. 8 according to the third embodiment, and therefore, a description thereof is omitted.

In step S1012, the CPU 101 determines whether a scale value calculated in step S1011 is larger than a certain value. As described above, the scale value indicates a driving amount (a step value) of the focus lens corresponding to a movement distance moved by a dragging operation performed by the user. Specifically, assuming that a movement distance moved by the dragging operation performed by the user is 1, the larger the driving amount of the focus lens is, the larger the scale value is. As the scale value is increased, a detailed operation performed by the user is difficult to reflect on the driving amount of the focus lens, and operability for the user is degraded. Accordingly, the video processing apparatus 100 of this embodiment determines whether the scale value is larger than the certain value (whether the operability for the user is degraded) and generates and displays UIs for instructing a driving amount of the focus lens in accordance with a result of the determination.

When it is determined that the scale value detected in step S1011 is not larger than the certain value (No in step S1012), the video processing apparatus 100 proceeds to a process in step S1015. On the other hand, when it is determined that the scale value detected in step S1011 is larger than the certain value in step S1012 (Yes in step S1012), the video processing apparatus 100 proceeds to a process in step S1013.

In the example illustrated in FIGS. 11A and 11B, a step value of the driving amount of the focus lens calculated based on a distance between a position of a starting point (a position of the handle 916) to a position of the object 702 (the position 705) specified first is smaller than the certain value. Accordingly, the process proceeds to step S1015. In step S1015, the CPU 101 displays, as with the process in step S812 of FIG. 8 according to the third embodiment, a slide bar 913 on the display screen 301 as illustrated in FIG. 11B. In step S1016, the CPU 101 determines, as with the process in step S813 of FIG. 8 according to the third embodiment, whether UIs for the MF process corresponding to all the objects specified by the user have been generated and displayed. Here, the generation and the display of the UIs for instructing the MF process to be performed on objects 703 and 704 have not been completed (No in step S1016), and therefore, the video processing apparatus 100 returns to the process in step S1009. Then the CPU 101 performs the process from step S1009 to step S1011 again on the object 703 specified second.

Note that, in step S1011, the CPU 101 determines a length of a slide bar 1411 as follows. Specifically, the CPU 101 determines a distance from a position of a starting point (the position 705 of the object 702) read in step S1009 to a position (a position 706) corresponding to the object 703 read in step S1010 as a length of the slide bar 1114. Furthermore, the CPU 101 determines a step value of a driving amount of the focus lens corresponding to a movement amount of the handle 916 on the slide bar 1114 in accordance with the driving amount of the focus lens read in step S1010.

When it is determined that the scale value detected in step S1011 is equal to or larger than the certain value in step S1012 (Yes in step S1012), the video processing apparatus 100 proceeds to a process in step S1013. As described above, when a rate of the difference value between the driving amount of the focus lens and the length from the position 705 of the object 702 to the position 706 of the object 703 is equal to or larger than the certain value, it is difficult for the user to perform an operation of instructing driving of the focus lens. Specifically, if the slide bar 1114 is formed as a line segment extending from the position 705 of the object 702 to the position of the object 703, the line segment is short, and therefore, it is difficult for the user to perform the operation of moving the handle 916 on the slide bar 1114 (the MF operation). Accordingly, the video processing apparatus 100 displays a curved slide bar in a case where the scale value is equal to or larger than the certain value.

In step S1013, the CPU 101 determines a length of the slide bar 1114 such that the slide bar 1114 is longer than a length of a line segment from the position 705 of the object 702 to the position 706 of the object 703. Note that, in step S1013, the CPU 101 may determine the length of the slide bar such that the slide bar is longer than a length predetermined by the user or the like.

In step S1014, the CPU 101 performs the scale calculation again in accordance with the length determined in step S1013 and the driving amount of the focus lens read in step S1010. Specifically, the CPU 101 determines a step value of the driving amount of the focus lens corresponding to the movement amount of the handle 916 on the slide bar 1114 by the scale calculation. In step S1015, the CPU 101 displays the slide bar 1114 on the display screen 301 as illustrated in FIG. 11B.

Thereafter, the video processing apparatus 100 performs the same process on the object 704 specified next and displays a slide bar 1115 on the display screen 301 as illustrated in FIG. 11B. After the process in step S1015 is performed on the objects 702 to 704, the CPU 101 determines that the UIs for the MF process to be performed on all the specified object have been generated and displayed in step S1016 (Yes in step S1016). The video processing apparatus 100 proceeds to a process in step S1017. A process from step S1017 to step S1022 is the same as the process from step S814 to step S819 of FIG. 8 according to the third embodiment, and therefore, a description thereof is omitted.

By performing the process in FIG. 10 described above, the video processing apparatus 100 of this embodiment may display the UIs (the slide bars and the handle) for specifying a position of the focus lens in a case where the focus process (focus adjustment) is performed on the objects. Furthermore, the video processing apparatus 100 may display graphics (in-focus marks) indicating positions (in-focus positions) of the focus lens when the objects are focused on in positions which are on the UI and which are on the objects displayed on the display screen. By this display, the user may intuitively perform an operation of adjusting focus on the object using the displayed UIs and the displayed in-focus marks. In addition, by performing the process of FIG. 10, the video processing apparatus 100 of this embodiment displays the curved slide bar in a case where the objects on the display screen are positioned close to each other and therefore the slide bar displayed between the objects is short. With this display, the user easily operates the handle on the slide bar.

As described above, according to the video processing apparatus 100 of this embodiment, the operation of adjusting focus until a specific object is focused on may be intuitively performed. Specifically, according to this embodiment, an apparatus which allows the user to easily operate a change of a moving speed of a focus operation until the object is focused on, an in-focus timing, and the like may be provided.

Furthermore, the video processing apparatus 100 of this embodiment displays the UIs (the slide bars) having starting points and/or end points in positions of the objects on the display screen in a specified order in positions between the objects in accordance with the positions of the specified objects on the display screen. Furthermore, the video processing apparatus 100 displays a slide bar as a curved line (a detour) instead of a line segment in a case where a step value of the driving amount of the focus lens is equal to or larger than a predetermined value when compared with a unit in which a handle is operable on the slide bar. With this display, the user may more easily perform an operation of adjusting focus when compared with the case where a slide bar is displayed as a line segment.

Fifth Embodiment

According to the first to fourth embodiments described above, the video processing apparatus 100 performs the process of focusing on an object corresponding to an in-focus mark in the case where the user performs an operation of matching a handle with the in-focus mark on a slide bar. In a fifth embodiment, a video processing apparatus 100 displays a handle and a frame indicating a width of depth of field on a slide bar before performing a focus process.

Figure 12:
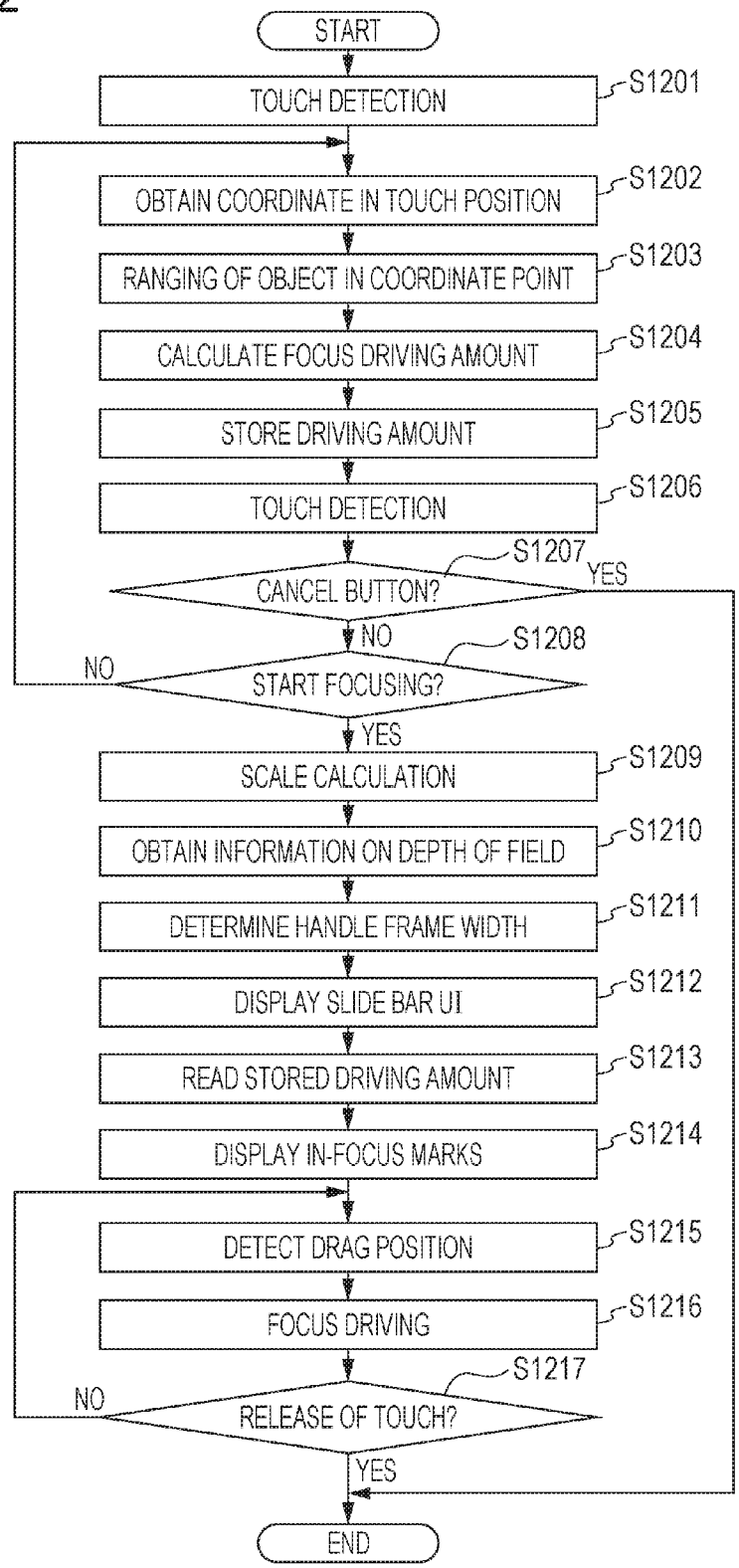
FIG. 12 is a flowchart illustrating a process performed by a video processing apparatus according to a fifth embodiment.

Hereinafter, a process performed by the video processing apparatus 100 of the fifth embodiment will be described in detail with reference to FIG. 12 and FIGS. 13A to 13D. FIG. 12 is a flowchart illustrating an operation of performing a focus process on objects performed by the video processing apparatus 100 according to the fifth embodiment. Furthermore, FIGS. 13A to 13D are diagrams illustrating a display screen of an UI unit 108 of the video processing apparatus 100 in a case where the video processing apparatus 100 performs the focus process on the objects.

First, a process performed by the video processing apparatus 100 will be described with reference to FIGS. 13A to 13D.

Figure 13A:
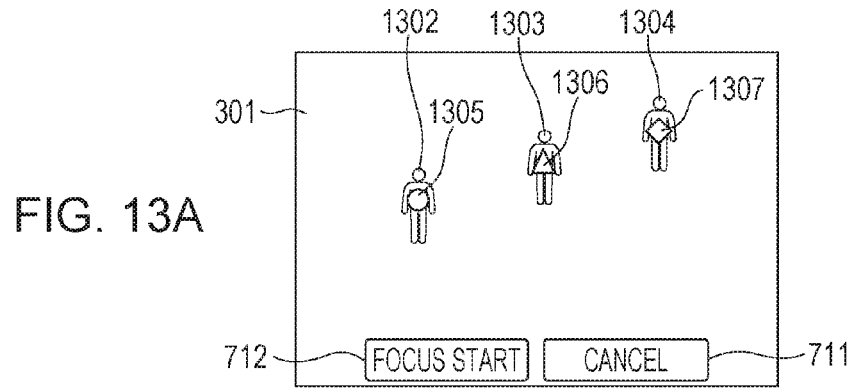
FIGS. 13A to 13D are diagrams illustrating a display screen displayed in a case where focus adjustment is performed according to the fifth embodiment.

FIG. 13A is a diagram illustrating an image displayed in a display screen 301 of the UI unit 108 in a case where a user performs a touch operation for specifying a plurality of objects to be focused on. As illustrated in FIG. 13A, objects 1302 to 1304 to be focused on are displayed in the display screen 301. Furthermore, cursors 1305 to 1307 are displayed in positions corresponding to the objects 1302 to 1304 on a display screen 301.

Figure 13B:
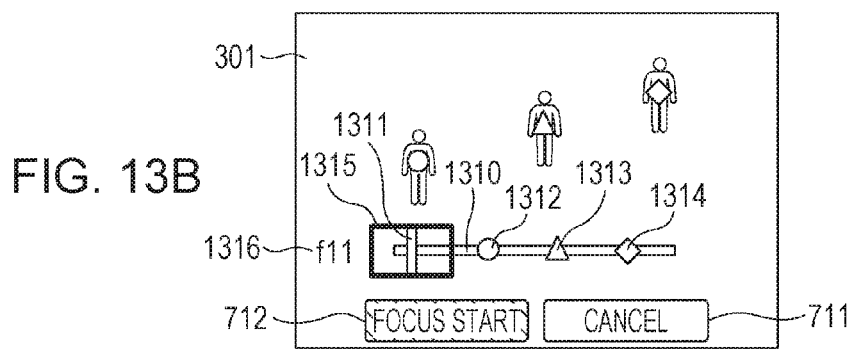

FIG. 13B is a diagram illustrating an image displayed on the display screen 301 in a case where a button 712 is operated so that an MF process is started after the objects 1302 to 1304 are specified as illustrated in FIG. 13A. As illustrated in FIG. 13B, a slide bar 1310 having a length corresponding to a distance between a pre-focus position and an in-focus position of the focus lens and a handle 1311 used to instruct a position of the focus lens in an optical axis direction are displayed on the display screen 301 as UIs to be used in the MF operation. Furthermore, in-focus marks 1312 to 1314 indicating positions (in-focus positions) of the focus lens in the optical axis direction when the objects 1302 to 1304 are focused on are displayed. Furthermore, a frame 1315 indicating the width of the depth of field added to the handle 1311 and information 1316 indicating an f-stop number of the focus lens before the focus process is performed are displayed.

Figure 13C:
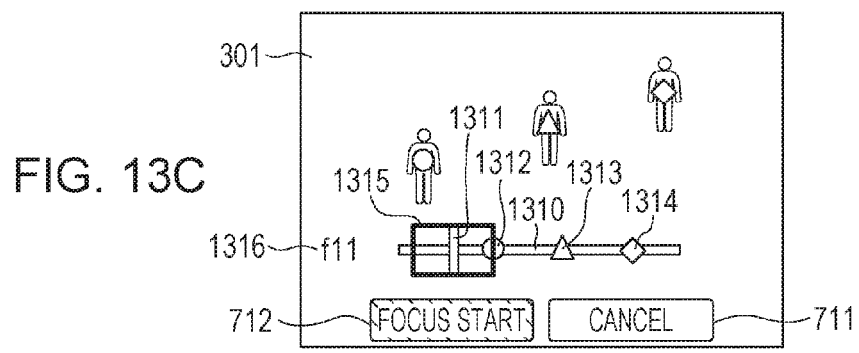
Figure 13D:
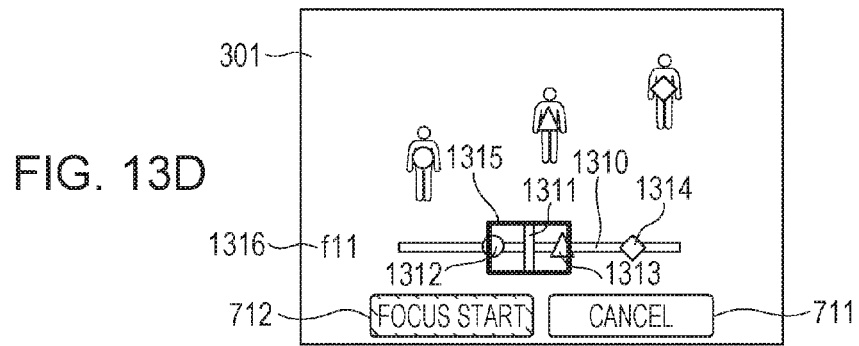

FIGS. 13C and 13D are diagrams illustrating images displayed on the display screen 301 in a case where the user operates the handle 1311. Note that FIGS. 13C and 13D are described in detail later.

Next, a process performed by the video processing apparatus 100 according to this embodiment will be described in detail with reference to FIG. 12. The video processing apparatus 100 starts the process illustrated in FIG. 12 when the user performs an operation of specifying an object to be subjected to the focus process (for example, at least one of the objects 1302 to 1304) as illustrated in FIG. 13A.

A process from step S1201 to step S1209 in FIG. 12 is the same as the process from step S601 to step S609 of FIG. 6 according to the second embodiment, and therefore, a description thereof is omitted. In this embodiment, among the objects 1302 to 1304, the object 1304 corresponds to the largest driving amount of the focus lens. Therefore, in step S1209, the CPU 101 performs a scale calculation using the driving amount of the focus lens corresponding to the object 1304.

In step S1210, the CPU 101 obtains information on the depth of field. Here, the depth of field is an allowable range in which a position in front of an in-focus position and a position in the rear of the in-focus position are seen to be simultaneously focused on. Furthermore, the depth of field is calculated in accordance of information on an f-stop number (an f-number), a focal length, an imaging range (a distance between an object and an imaging unit), a resolution of an imaging element in the imaging unit, and the like, and any method may be used for calculating the depth of field.

In step S1211, the CPU 101 determines a width of the frame indicating the depth of field (a horizontal width of the frame 1315 of FIG. 13B) in accordance with the information on the depth of field obtained in step S1210. Specifically, the CPU 101 increases the width of the frame indicating the depth of field as the depth of field becomes larger and reduces the width of the frame indicating the depth of field as the depth of field becomes smaller.

In step S1212, the CPU 101 executes a function of a display controller 206. Specifically, the CPU 101 displays the UIs for indicating the driving amounts of the focus lens (the slide bar 1310 and the handle 1311 in FIG. 13B) on the display screen 301 in accordance with a result of the scale calculation performed in step S1209. Furthermore, the CPU 101 displays the frame 1315 indicating the depth of field in accordance with the width of the frame indicating the depth of field determined in step S1211. The frame 1315 indicating the depth of field moves simultaneously with the handle 1311. The frame 1315 indicating the depth of field is displayed in a state in which the handle 1311 is positioned at a center of the frame 1315 in this embodiment. The CPU 101 may focus on the object corresponding to the in-focus mark included in the frame 1315 in a case where the in-focus mark indicating the in-focus position is included in the frame 1315 indicating the depth of field as a result of the operation performed by the user on the handle 1311. Furthermore, in step S1212, the CPU 101 displays the information 1316 indicating the f-stop number in accordance with the f-stop number obtained in step S1210. In this way, by displaying the information 1316 indicating the f-stop number, the user may visually recognize the f-stop number.

Thereafter, a process from step S1213 to step S1217 is the same as the process from step S611 to step S615 of FIG. 6 according to the second embodiment, and therefore, a description thereof is omitted. Specifically, in step S1214, the CPU 101 displays the in-focus marks 1312 to 1314 indicating in-focus positions of the plurality of objects (the objects 1302 to 1304) on the slide bar 1310. In step S1216, the CPU 101 focuses on the object corresponding to the in-focus mark included in the frame 1315 indicating the depth of field in accordance with the operation performed by the user on the handle 1311 and the frame 1315 indicating the depth of field.

Here, an example of a focus process performed by the video processing apparatus 100 when the user operates the handle 1311 will be described with reference to FIGS. 13C and 13D. For example, a case where the in-focus mark 1312 is included in the frame 1315 indicating the depth of field as a result of the operation on the handle 1311 performed by the user as illustrated in FIG. 13C will be described. In this case, the video processing apparatus 100 may perform a focus process to the degree that the object 1302 corresponding to the in-focus mark 1312 is seen to be focused on. In this way, even in a state in which the handle 1311 does not match the position of the in-focus mark 1312, if the in-focus mark 1312 is included in the frame 1315, the object 1302 may be focused on. As another example, a case where the in-focus marks 1312 and 1313 are included in the frame 1315 indicating the depth of field as a result of the operation of the handle 1311 performed by the user as illustrated in FIG. 13D will be described. In this case, the video processing apparatus 100 performs a focus process to a degree that the objects 1302 and 1303 corresponding to the in-focus marks 1312 and 1313, respectively, are seen to be focused on.

By performing the process described above in FIG. 12, the video processing apparatus 100 of this embodiment may display UIs (the slide bar and the handle) for specifying a position of the focus lens in a case where the focus process (focus adjustment) is performed on the object. Furthermore, the video processing apparatus 100 may display a graphics (in-focus marks) indicating positions (in-focus positions) of the focus lens on the UI when the object is focused on. In addition, by performing the process illustrated in FIG. 12, the video processing apparatus 100 of this embodiment may display the handle and the frame indicating the width of the depth of field on the slide bar. By this display, the user may perform an operation of adjusting focus on an object taking the depth of field into consideration.

As described above, according to the video processing apparatus 100 of this embodiment, the operation of adjusting focus until a specific object is focused on may be intuitively performed. Specifically, according to this embodiment, an apparatus which allows the user to easily operate a change of a moving speed of a focus operation until the object is focused on, an in-focus timing, and the like may be provided.

Furthermore, the video processing apparatus 100 of this embodiment displays the handle and the frame indicating the width of the depth of field on the slide bar. The video processing apparatus 100 may focus on the object corresponding to the focus mark included in the frame indicating the width of the depth of field. With this configuration, the user may perform an operation of focusing on an object to be focused on with ease taking the depth of field into consideration. Furthermore, to avoid focus on an object which is not to be focused on, the user operates the handle so that an in-focus mark corresponding to the object which is not to be focused is not included in the frame indicating the width of the depth of field. In this way, the user may perform an operation of avoiding focusing on an object which is not to be focused with ease taking the depth of field into consideration.

Sixth Embodiment

According to the first to fourth embodiments described above, the video processing apparatus 100 performs the process of focusing on an object corresponding to an in-focus mark in the case where the user performs an operation of matching a handle with the in-focus mark on a slide bar. In a sixth embodiment, even if a handle on a slide bar does not match an in-focus mark, an object corresponding to the in-focus mark may be focused on in a case where the handle is operated to be moved to a position sufficiently close to the in-focus mark.

Figure 14:
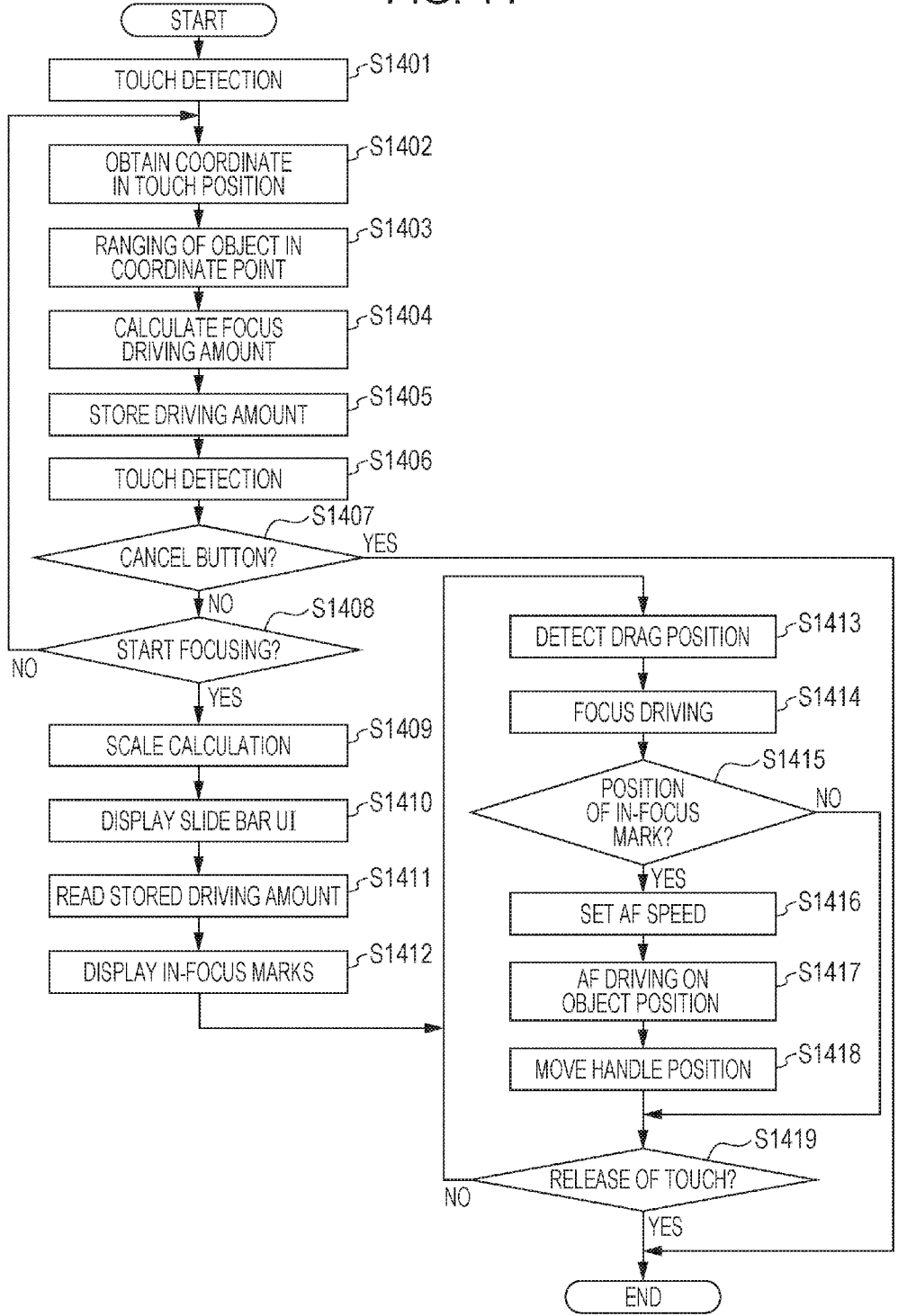
FIG. 14 is a flowchart illustrating a process performed by a video processing apparatus according to a sixth embodiment.
Figure 15A:
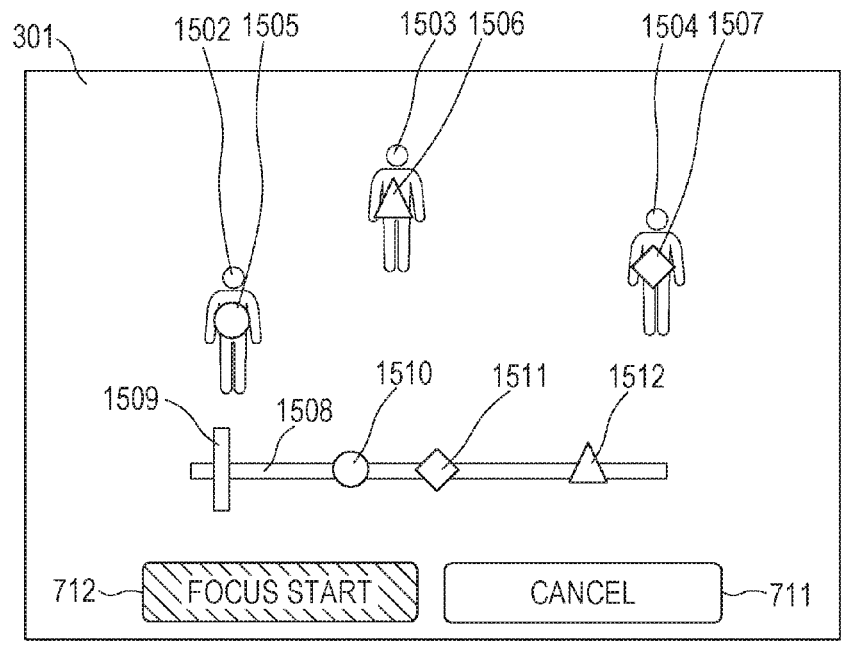
FIGS. 15A and 15B are diagrams illustrating a display screen displayed in a case where focus adjustment is performed according to the sixth embodiment.

Hereinafter, a process performed by a video processing apparatus 100 according to the sixth embodiment will be described with reference to FIG. 14 and FIGS. 15A and 15B. FIG. 14 is a flowchart illustrating an operation of performing a focus process on objects performed by the video processing apparatus 100 according to the sixth embodiment. Furthermore, FIGS. 15A and 15B are diagrams illustrating a display screen in a display unit of an UI unit 108 included in the video processing apparatus 100 when the video processing apparatus 100 performs the focus process on objects.

First, a process performed by the video processing apparatus 100 will be described with reference to FIGS. 15A and 15B. FIG. 15A is a diagram illustrating an image displayed on the display screen 301 in a case where the button 712 is operated so that an MF process is started after objects 1502 to 1504 are specified. As illustrated in FIG. 15A, the objects 1502 to 1504 to be focused on are displayed in a display screen 301. Furthermore, cursors 1505 to 1507 are displayed in positions touched by the user on the display screen 301 when the user performs a touch operation of specifying the objects 1502 to 1504. Furthermore, as illustrated in FIG. 15A, a slide bar 1508 and a handle 1509 used to instruct (change) a position of the focus lens in an optical axis direction are displayed on the display screen 301 as UIs to be used in the MF operation. Furthermore, in-focus marks 1510 to 1512 indicating positions (in-focus positions) of the focus lens in the optical axis direction when the objects 1502 to 1504 are focused on are displayed on the slide bar 1508. Note that when the user operates a button 712 in the state of FIG. 7A after specifying the objects 1502 to 1504, the button 712 illustrated in FIG. 15A is displayed so that it is recognized that an MF process is started.

Figure 15B:
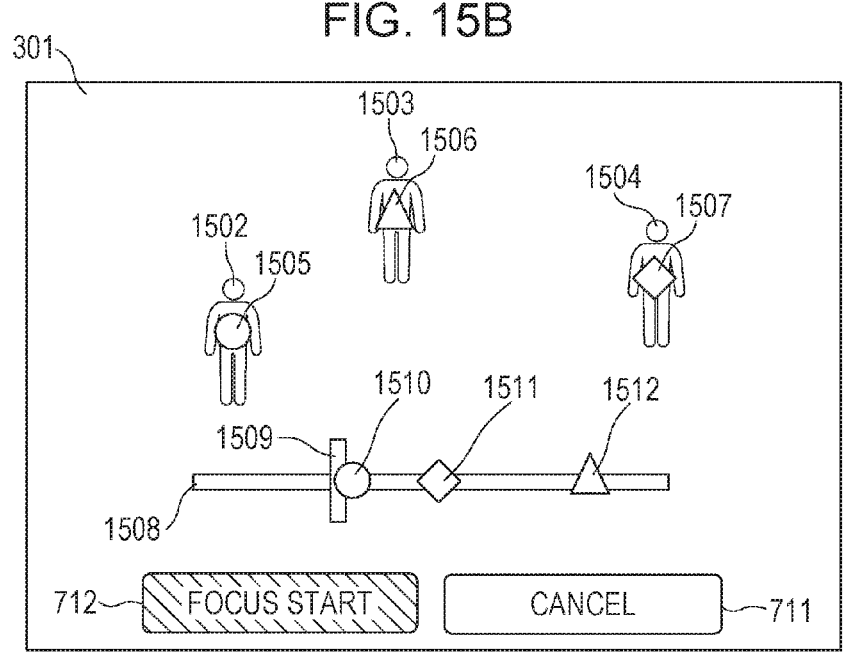

FIG. 15B is a diagram illustrating an image displayed on the display screen 301 in a case where the user operates the handle 1509. As illustrated in FIG. 15B, the handle 1509 is disposed sufficiently close to the in-focus mark 1510.

Next, a process performed by the video processing apparatus 100 according to this embodiment will be described in detail with reference to FIG. 14. The video processing apparatus 100 starts the process illustrated in FIG. 14 when the user performs an operation of specifying an object to be subjected to the focus process (for example, at least one of the objects 1502 to 1504) as illustrated in FIG. 15A. A process from step S1401 to step S1414 in FIG. 14 is the same as the process from step S601 to step S614 of FIG. 6 according to the second embodiment, and therefore, a description thereof is omitted.

In step S1415, the CPU 101 determines whether an in-focus mark (at least one of the in-focus marks 1510 to 1512) is detected within a predetermined distance from the handle (the handle 1509 of FIG. 15B) for instructing a position of the focus lens in an optical axis direction. When the CPU 101 determines that the in-focus mark is detected within the predetermined distance (Yes in step S1415), the process proceeds to step S1416. On the other hand, when the CPU 101 determines that the in-focus mark is not detected within the predetermined distance (No in step S1415), the process proceeds to step S1419. For example, as a result of the user's operation, when the handle 1509 is located in a position illustrated in FIG. 15B, the CPU 101 performs the following process in step S1415. Specifically, the CPU 101 determines that the in-focus mark 1510 corresponding to the object 1502 is positioned within a predetermined distance from the handle 1509 (a range sufficiently close to the handle 1509), and proceeds to a process in step S1416.

In step S1416, the CPU 101 sets a driving speed of the focus lens in an AF process in accordance with the result of a scale calculation (the scale value) performed in step S1409. Specifically, the CPU 101 increases the driving speed of the focus lens as the scale value (a driving amount of the focus lens relative to a movement distance of the slide bar) becomes larger, and reduces the driving speed as the scale value becomes smaller.

In step S1417, the video processing apparatus 100 executes the AF process on the object corresponding to the in-focus mark positioned within the predetermined distance from the handle in accordance with a result of the determination performed in step S1415. Specifically, in step S1417, the video processing apparatus 100 executes the AF process on the object 1502 corresponding to the in-focus mark 1510 positioned within the predetermined distance from the handle 1509 as illustrated in FIG. 15B.

In step S1418, the CPU 101 moves the handle (the handle 1509 of FIG. 15B) to a position of the in-focus mark (the in-focus mark 1510) determined to be within the predetermined distance from the handle in step S1415 and displays the handle.

In step S1419, as with step S414 of FIG. 4 according to the first embodiment, the CPU 101 determines whether the user's operation has been terminated. When the CPU 101 determines that the user's operation has not been terminated in step S1419 (No in step S1419), the process returns to step S1413. On the other hand, when the CPU 101 determines that the user's operation has been terminated in step S1419 (Yes in step S1419), the focus process is terminated.

By performing the process described above in FIG. 14, the video processing apparatus 100 of this embodiment may display UIs (the slide bar and the handle) for specifying a position of the focus lens in a case where the focus process (focus adjustment) is performed on the object. Furthermore, the video processing apparatus 100 may display graphics (in-focus marks) indicating positions (in-focus positions) of the focus lens on the UI when the object is focused on. In addition, by performing the process in FIG. 14, even if a handle on a slide bar does not match an in-focus mark, the video processing apparatus 100 of this embodiment may focus on an object corresponding to the in-focus mark when the handle is operated to be moved to a position sufficiently close to the in-focus mark.

As described above, according to the video processing apparatus 100 of this embodiment, the operation of adjusting focus until a specific object is focused on may be intuitively performed even by a user who does not have specialized experience. Specifically, according to this embodiment, an apparatus which allows the user to easily operate a change of a moving speed of a focus operation until the object is focused on, an in-focus timing, and the like may be provided.

Furthermore, the video processing apparatus 100 of this embodiment may focus on an object corresponding to an in-focus mark in a case where a position of a handle operated by a user and a position of the in-focus mark are within a predetermined distance. With this configuration, in a handle operation for the MF process performed by the user, even in a case where a position of a handle is shifted from a position of an in-focus mark by a predetermined distance, the video processing apparatus 100 may focus on an object corresponding to the in-focus mark. Furthermore, even if the object is moved while the user performs an operation for the MF is performed, the video processing apparatus 100 may focus on the moved object by performing the AF process.

Other Embodiments

Although the units of the hardware of the video processing apparatus are included in a single apparatus according to the first to sixth embodiments described above, the present invention is not limited to this. Specifically, some of the units of the video processing apparatus may be included in another apparatus. For example, the UI unit 108 of the video processing apparatus 100 may be included in another apparatus (a tablet apparatus, for example) connected to the video processing apparatus 100 in a wired manner or a wireless manner. Furthermore, the camera unit 104 of the video processing apparatus 100 may be included in another apparatus (an imaging apparatus, for example) connected to the video processing apparatus 100 in a wired manner or a wireless manner.

Furthermore, although the video processing apparatus 100 displays a UI in a sliding form (a slide bar) as a UI to be used in the MF process according to the first to sixth embodiments described above, other types of UIs may be used. Specifically, any UI may be used as long as the user may intuitively perform an operation of adjusting focus on the UI and a position of the focus lens is visually recognized when an object is focused on.

Furthermore, instead of the display of the slide bar and/or the handle, a graphic indicating a position (a starting position) of the focus lens in the optical axis direction may be displayed at a time of starting of focus adjustment and a graphic indicating a position (an in-focus position) of the focus lens may be displayed when the object is focused on. Then, in a case where an operation of specifying a position of the focus lens is performed by the user, a position of the focus lens may be set in accordance with a position touched by the user, a position of the graphic indicating the starting position, and a position of the graphic indicating the in-focus position. Assuming that the graphic indicating the starting position is located in a position of a coordinate (1, 3), the graphic indicating the in-focus position is located in a position in a coordinate (11, 3), and a position touched by the user is a coordinate (6, 3), the video processing apparatus 100 performs the following process. Specifically, the focus lens is moved to a certain position such that a distance to a position of the focus lens at a time of focusing is half of a distance from the position of the focus lens at a time when the focus adjustment is started to a position of the focus lens at a time when focusing is performed.

Furthermore, although the video processing apparatus 100 displays in-focus positions corresponding to the plurality of objects such that the user may recognize the in-focus positions by using icons having unique shapes for the in-focus marks corresponding to objects according to the first to sixth embodiments, the present invention is not limited to the display of in-focus marks. Specifically, any display method may be employed as long as the in-focus marks corresponding to the plurality of objects are displayed in a discriminable manner. For example, the in-focus marks corresponding to the objects may be displayed so as to correspond to the objects using different colors, different letter symbols, and/or different names of the objects.

Furthermore, although the video processing apparatus 100 according to the first to sixth embodiments displays the in-focus marks corresponding to all the specified objects on the slide bar in a case where the user specifies the plurality of objects as targets of focus adjustment, the present invention is not limited to this. For example, only an in-focus mark of an object to be subjected to the focus adjustment next may be displayed on the slide bar in accordance with a specified order of the objects. With this configuration, the user may easily recognize an object to be subjected to the focus adjustment even in a case where a large number of objects are specified.

Furthermore, according to the first to sixth embodiments described above, the button 711 used to cancel specifying after an object is specified and the button 712 used to start the MF process on the specified object are displayed on the display screen 301. However, the present invention is not limited to this, and the buttons 711 and 712 may be physical buttons. Specifically, in a case where the user presses a physical button, the input unit of the UI unit 108 included in the video processing apparatus 100 may detect the pressing of the button.

Furthermore, at least two of the first to sixth embodiments may be combined with each other. For example, the frame indicating the width of the depth of field according to the fifth embodiment illustrated in FIGS. 13B to 13D may be displayed in addition to the display of the other embodiments.

Furthermore, although the video processing apparatus 100 according to the first to sixth embodiments employs the image plane phase difference AF method as a focus adjustment method, the present invention is not limited to this, and a contrast method may be employed. Specifically, any method may be used as long as an in-focus state is detected.

The present invention may be realized by a process of supplying a program which realizes at least one of the functions of the foregoing embodiments to a system or an apparatus through a network or a storage medium and causing at least one processor included in a computer of the system or the apparatus to read and execute the program. Furthermore, the present invention may be realized by a circuit which realizes at least one of the functions (an ASIC, for example).

According to the foregoing embodiments, a focus adjustment operation for focusing a specific object may be easily performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-173285, filed Sep. 2, 2015, which is hereby incorporated by reference herein in its entirety.

What is claimed is:

1. A video processing apparatus that controls an imaging apparatus capable of changing a focus position, the video processing apparatus comprising:
   a detection unit configured to detect a focus position where a certain object is focused on;
   a controller configured to control the imaging apparatus such that a focus position in the imaging apparatus is changed to the focus position where the certain object is focused on which is detected by the detection unit in accordance with a certain operation; and
   a display controller configured to display, on a display screen,
      a first mark indicating a current focus position of the imaging apparatus in a focus range in which the imaging apparatus is capable of changing a focus position,
      a second mark indicating an in-focus position where the certain object is focused on which is detected by the detection unit in the focus range, and
      a frame indicating a width of a depth of field on a sliding user interface.

2. The video processing apparatus according to claim 1, further comprising a determination unit configured to determine, when an operation of moving the first mark is performed, an amount of change of the focus position in accordance with the operation.

3. The video processing apparatus according to claim 1, wherein the certain operation is an operation of moving the first mark to the second mark.

4. The video processing apparatus according to claim 1, wherein, in a case where a plurality of objects are selected as the certain objects, the display controller displays a plurality of second marks corresponding to the plurality of objects on the display screen.

5. The video processing apparatus according to claim 4, wherein the display controller displays the plurality of second marks on the display screen with sequential numbers of the plurality of objects indicating order of selection.

6. The video processing apparatus according to claim 4, wherein each of the plurality of second marks is visually distinguishable from each other.

7. The video processing apparatus according to claim 1, wherein the display controller displays a sliding user interface which connects the first and second marks to each other on the display screen.

8. The video processing apparatus according to claim 7, wherein the display controller displays, on the display screen, a sliding user interface having a length based on a position of a focus lens of the imaging apparatus before the focus position is changed to the focus position where the certain object is focused on and a position of the focus lens of the imaging apparatus after the focus position is changed to the focus position where the certain object is focused on.

9. The video processing apparatus according to claim 8, wherein the display controller determines whether the sliding user interface is displayed in a linear fashion or a curved fashion based on a position of a focus lens of the imaging apparatus before the focus position is changed to the focus position where the certain object is focused on and a position of the focus lens of the imaging apparatus after the focus position is changed to the focus position where the certain object is focused on.

10. The video processing apparatus according to claim 1, wherein the display controller displays on the display screen:
   an image that includes the certain object and overlays a cursor on top of the certain object, wherein the cursor has the same shape as the second mark; and
   the sliding user interface that includes:
      the first mark which indicates the current focus position, and
      the second mark indicating the in focus position of the certain object as detected by the detection unit.

11. The video processing apparatus according to claim 10, wherein:
   the display controller further displays a plurality of second marks associated with a plurality of certain objects:
   wherein the image includes the plurality certain objects;
   wherein a plurality of cursors are overlaid on top of the plurality of certain objects;
   wherein the sliding user interface further comprises the plurality of second marks each indicating the in focus position of the associated certain objects as detected by the detection unit;
   wherein each of the plurality of second marks has a unique shape relative to the plurality of second marks; and
   wherein shape of each cursor is the same as the shape of the second mark on which each cursor is overlaid on.

12. The video processing apparatus according to claim 10, wherein the second mark overlaid on top of the certain object is an icon unique to the certain object.

13. The video processing apparatus according to claim 1, wherein the display controller displays on the display screen: an image that includes a plurality of certain objects in the image and overlays a sliding user interface between the plurality of certain objects; wherein an intersection of each of the plurality certain objects with the sliding user interface indicates an in focus position of each of the plurality certain objects.

14. A control method for controlling an imaging apparatus capable of changing a focus position, the control method comprising:
   detecting a focus position where a certain object is focused on;
   controlling the imaging apparatus such that a focus position in the imaging apparatus is changed to the detected focus position where the certain object is focused on in accordance with a certain operation; and
   displaying, on a display screen,
      a first mark indicating a current focus position of the imaging apparatus in a focus range in which the imaging apparatus is capable of changing a focus position,
      a second mark indicating an in-focus position where the certain object is focused on which is detected in the focus range, and
      a frame indicating a width of a depth of field on a sliding user interface.

15. A computer readable non-transitory recording medium that stores a program that causes a computer to function as:
   a detection unit configured to detect a focus position where a certain object is focused on;
   a controller configured to control the imaging apparatus such that a focus position in the imaging apparatus capable of changing a focus position is changed to the focus position where the certain object is focused on which is detected by the detection unit in accordance with a certain operation; and
   a display controller configured to display, on a display screen,
      a first mark indicating a current focus position of the imaging apparatus in a focus range in which the imaging apparatus is capable of changing a focus position,
      a second mark indicating an in-focus position where the certain object is focused on which is detected by the detection unit in the focus range, and
      a frame indicating a width of a depth of field on a sliding user interface.

* * * * *